(12) United States Patent
Nagy et al.

(10) Patent No.: US 6,462,009 B1
(45) Date of Patent: Oct. 8, 2002

(54) HYDROPHOBIZING MICROEMULSIONS WHICH IMPROVE THE PROTECTION, DRYING RATE AND SHINE OF SURFACES

(75) Inventors: Andras Nagy, Akron, OH (US); Joseph P. Kennedy, Akron, OH (US); Lonn L. Swinehart, Naples, FL (US)

(73) Assignee: Capital Chemical Company, North Canton, OH (US)

( * ) Notice: Subject to any disclaimer, the term of this patent is extended or adjusted under 35 U.S.C. 154(b) by 0 days.

(21) Appl. No.: 09/549,927

(22) Filed: Apr. 14, 2000

(51) Int. Cl.[7] .............................. C11D 3/18; C11D 3/37; C11D 3/43

(52) U.S. Cl. .................. 510/417; 510/475; 510/504; 106/2

(58) Field of Search .................. 252/78.1, 79; 424/65, 424/70.1, 632; 510/122, 125, 424, 417, 274, 422, 428, 432, 475, 504, 506; 8/142; 106/2, 244

(56) References Cited

U.S. PATENT DOCUMENTS

| | | |
|---|---|---|
| 2,728,684 A | 12/1955 | Darragh |
| 3,222,201 A | 12/1965 | Boyle et al. |
| 3,222,213 A | 12/1965 | Clark |
| 3,440,063 A | 4/1969 | Chestochowski et al. |
| 3,483,927 A | 12/1969 | Nimerick et al. |
| 3,493,362 A | 2/1970 | Ferm |
| 3,508,933 A | 4/1970 | Yates |
| 3,551,168 A | 12/1970 | Atherton et al. |
| 3,658,718 A | 4/1972 | Clumpner |
| 3,711,409 A | 1/1973 | Ayres et al. |
| 3,852,075 A | 12/1974 | Basadur |
| 3,968,066 A | * 7/1976 | Mueller |
| 4,208,301 A | 6/1980 | Gammon |
| 4,547,401 A | 10/1985 | Shore |
| 4,832,702 A | 5/1989 | Kummer et al. |
| 5,221,329 A | 6/1993 | Tarr |
| 5,391,325 A | 2/1995 | Swenson et al. |
| 5,514,419 A | 5/1996 | Popa et al. |
| 5,514,519 A | 5/1996 | Popa et al. |
| 5,695,551 A | * 12/1997 | Buckingham et al. |
| 5,827,451 A | 10/1998 | Cummings et al. |
| 5,851,272 A | 12/1998 | Vicenzi |
| 5,871,590 A | 2/1999 | Hei et al. |

OTHER PUBLICATIONS

*Silicone Specialties for Household Care*, GE Silicones, Division of General Electric Company, 260 Hudson River Road, Waterford, NY 1993.

*The Glycol Ethers Handbook*, Dow Corning Corporation 1993.

*Information About Polish Ingredients*, Form No. 22–264B–90, Dow Corning Corporation 1990.

*Information About Silicone Emulsions*, Form No. 25–245–92, Dow Corning Corporation 1992.

*Vikopol® Epoxidized Polybutene Technical Information*, Elf Atochem, North America, Inc., Two Appletree Square, Minneapolis, MN 55425 Jan. 5, 1995.

*Actipol™ Activated Polybutene by Amoco Chemical*, Amoco Chemical Company, 200 East Randolph Drive, Chicago, IL 60601 1995.

APG–232D, Advanced Polymer, Inc., 654 Gotham Parkway, Carlstadt, New Jersey 07072 1996.

(List continued on next page.)

*Primary Examiner*—Gregory E. Webb
(74) *Attorney, Agent, or Firm*—Hudak & Shunk Co., L.P.A.; Daniel J. Hudak, Jr.

(57) ABSTRACT

The present invention relates to microemulsion compositions which can be utilized as coatings to improve the drying rate, protection, and shine of various surfaces, specifically metallic vehicle surfaces. Polyisobutylene copolymers and derivatives thereof are utilized as a hydrophobe.

29 Claims, 12 Drawing Sheets

OTHER PUBLICATIONS

*Surface Tension Methods*, Wilhelmy, L. "Ueber die Abhängigkeit der Capillaritätis–Constanten des Alkohols von Substanz und Gestal des benetzten festen Korpers", Ann. Physik, 1893, 199, 177–217.

*DCA–312 Instruction Manual,* Cahn Instruments, Inc., 5225 Verona Rd., Bldg. #1, Madison, WI 53711 1991.

*Quatemaries*, May 2, 1996 Tomah Products, Inc., 1012 Terra Drive, P.O. Box 388, Milton, WI 53563–0388.

* cited by examiner

HYDROPHOBIZING MICROEMULSIONS WHICH IMPROVE THE PROTECTION, DRYING RATE AND SHINE OF SURFACES

FIELD OF THE INVENTION

The present invention relates to microemulsion compositions which improve the drying rate, protection, and shine of various surfaces, specifically metallic vehicle surfaces. The coatings of the microemulsion compositions last significantly longer, more easily remove water, and provide shinier surface protection than coating compositions previously known in the art. The microemulsion composition applied to surfaces provides hydrophobized surfaces and leads to increased contact angles for water droplets, and thus a smaller "footprint" of the water droplets to facilitate their removal.

BACKGROUND OF THE INVENTION

In the commercial automatic vehicle wash setting, it is desirable to apply a vehicle or automotive wash aid such as a drying agent and/or synthetic spray wax after the car is washed and rinsed. The drying agents or spray waxes are typically applied by spraying them onto the surface of the automobile during or after the rinse cycle. The drying agent-spray wax compositions electrostatically bond to the automobile surface. Depending on the hydrophobicity of the composition, the residual water which clings to the surface tends to form beads or is "beaded". Depending on the characteristics of the drying agents and/or spray wax, the water will run off the surface at a certain rate, especially if during the drying step jets of air are directed tangentially to the automobile's surface. Prior art drying agents and spray waxes typically utilize an oil based hydrophobe which tend to have poor durability and result in a greasy film which can be left on the windshield or glass surfaces of an automobile.

U.S. Pat. No. 5,871,590 to Hei et al., relates to a touchless car wash composition that can be made from a concentrate and diluted to use concentration using commonly available service water can comprise an ether amine or diamine in particular a fatty ether amine or diamine.

U.S. Pat. No. 5,851,272 to Vicenzi, relates to an automobile spray wax composition incorporating an aromatic compound having at least one of two linear $C_8$ to $C_{20}$ alkyl substituents, and a preferred embodiment thereof including a compound identified and characterized by a CAS registry number of 68988-79-4.

U.S. Pat. No. 5,514,419 to Popa et al., relates to a method for treating and protecting a substrate, said method comprising coating the surface of said substrate with a composition comprising a blend of (a) a polydimethylsiloxane polymer having a viscosity at 25° C. of 5 to 100,000 cS; and (b) a polyisobutylene oligomer having a number average molecular weight of 200 to 550. The treatment imparts an aesthetically pleasing appearance to the surfaces of plastic, rubber or leather substrates whereby surface gloss is enhanced, but not excessively, as is the case for a comparable all-silicone treating agent.

U.S. Pat. No. 5,391,325 to Swenson et al., relates to emulsion compositions which are used as auto spray waxes or rinse or drying aids in automatic car washes. The inventive emulsion replaces mineral seal oil of prior art emulsions with more environmentally acceptable simple esters of natural fatty acids having the general structural formula:

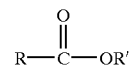

wherein R—C is from an acid moiety having approximately 12–26 carbon atoms, and R' is from an alcohol moiety having approximately 1–5 carbon atoms. In an additional embodiment, the emulsion composition can include an amine oxide coupling solvent or solubilizer.

U.S. Pat. No. 5,221,329 to Tarr, relates to water repellent compositions including a silico-titanium polymer, a cationic, surface-active quaternary ammonium compound, and a spreading agent which provides odor detection properties.

U.S. Pat. No. 4,832,702 to Kummer, et al., relates to a proposed fuel or lubricant composition which contains one or more polybutyl or polyisobutylamines of the general formula:

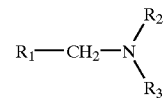

where $R_1$ is a polybutyl- or polyisobutyl radical derived from isobutene and up to 20% by weight of n-butene and $R_2$ and $R_3$ are identical or different and are each hydrogen, an aliphatic or aromatic hydrocarbon, a primary or secondary, aromatic or aliphatic aminoalkylene radical or polyaminoalkylene radical, a polyoxyalkylene radical, or a hetaryl or hetercyclyl radical, or, together with the nitrogen atom to which they are bonded, form a ring in which further hetero atoms may be present.

U.S. Pat. No. 4,547,401 to Shore, is related to the cleaning of the surface of an object, such as an automobile, during which the surface is subjected to a detergent and then rinsed with water and dried by beading, an optical brightener is injected into, or contained in, the detergent and/or the rinsing water and/or the beading material. The inclusion of the optical brightener not only improves the appearance of the cleaned object, giving it luster and causing it to gleam, but also materially accelerates or improves the beading.

U.S. Pat. No. 4,208,301 to Gammon, relates to microemulsion defoamer compositions which are oil in water colloidal dispersions useful in defoaming aqueous systems such as in paper machines and latex paints. These compositions are prepared by mixing a water dispersible organic material, ethylene oxide condensate, coupling agent, water, basic material and antigelling agent.

U.S. Pat. No. 3,852,075 to Basadur, relates to a composition for improving the efficiency of automatic carwash establishments by facilitating the drying of cars and for imparting a protective coating to hard surfaces such as the exterior of cars which comprises non-volatile mineral oil, amine-functional polydimethylsiloxane (AFDS) and cationic emulsifier at critical levels and in critical proportions. A method for applying a protective coating to hard surfaces is also provided.

U.S. Pat. No. 3,711,409 to Ayres et al., relates to an ice-preventive and de-icing material for application to metallic objects, such as railway switches and the like, which is in the form of a viscous, stable, oil-in-water emulsion, comprising about 5% to 30% of the lubricant oil or grease, which is substantially insoluble in water, as the disperse phase; about 2 to 20% of a cationic or non-ionic surface active agent as an emulsifying agent; and the balance an aqueous solution, as the continuous phase, containing about 2 to 5% of the total composition of a water-absorbing, viscosity-maintaining compound and a sufficient amount of a freezing point depressant for water to lower the freezing point of the water which the composition comes into contact and thereby prevent the formation of ice on the protected object or remove ice from the protected object, provide lubrication of parts where required and prevent adhesion of parts as needed.

U.S. Pat. No. 3,658,718 to Clumpner, relates to an emulsifier system for forming a stable oil and water emulsion which contains mixtures of difatty ethoxylated quaternized amidoamines in which the fatty acid residues are derived from soya and coconut oil.

U.S. Pat. No. 3,551,168 to Atherton et al., relates to a protective polish composition for auto laundries of a dicoco dimethyl quaternary amine, an ethoxylated tertiary amine and an emulsifiable mineral oil.

U.S. Pat. No. 3,508,933 to Yates, relates to wax containing automobile polishes made detergent resistant by incorporating therein the reaction product of. a hydroxyl endblocked polydimethylsiloxane having a viscosity in the range of 10 to 15,00 cs., and a silane selected from the group consisting of those having the general formulae

wherein R''' is a hydrogen atom or a methyl radical, R'' is a monovalent hydrocarbon radical free of aliphatic unsaturation and contains from 1 to 6 carbon atoms, n has a value of from 0 to 2, R' is an alkyl radical containing from 1 to 4 carbon atoms, and R is a divalent hydrocarbon radical free of aliphatic unsaturation and contains 3 to 4 carbon atoms, the weight ratio of the siloxane to the silane being in the range of about 1:1 to 20:1.

U.S. Pat. No. 3,440,063 to Chestochowski et al., relates to an emulsion composition for use in automatic car washes comprising a monoester ($C_6$–$C_{12}$ moieties), an acetic acid salt of a fatty amine, a hydrotrope, a short chain alcohol and water; processes for removing water from automobiles utilizing said emulsion compositions.

U.S. Pat. No. 3,222,213 to Clark, relates to preparations for treating cleaned surfaces. In one aspect, this invention relates to emulsified formulations for rinsing previously cleaned automobiles.

U.S. Pat. No. 3,222,201 to Boyle, et al., relates to cleaning and coating formulations. More particularly, this invention relates to oil-in-water emulsions suitable for simultaneous cleaning and coating of finished surfaces.

SUMMARY OF THE INVENTION

A stable emulsion such as the hydrophobizing microemulsion compositions of the present invention, in addition to improving appearance of the target surface, provide protection and allow the surfaces to dry faster. The microemulsion composition of the present invention generally comprise a) a hydrophobe component which always at least comprises a polyisobutylene of some form, or a copolymer or derivative thereof, b) an emulsifying component, c) optionally but desirably solvent and d) optionally but preferably water. When applied to a surface, the compositions of the present invention cause water, such as rain water or rinse water from a carwash, to bead up and have much higher contact angles when compared to prior art compositions. The higher the contact angle, the more easily the water can be removed by running off the surface, by gravity, or by being blown off by jets of air from a commercial drier. Accordingly, it is an object of the present invention to increase the hydrophobicity of the surfaces in order to attain these objectives.

DETAILED DESCRIPTION OF THE INVENTION

The present invention discloses emulsions such as microemulsion compositions for use as a vehicle or automotive car wash aid such as a spray wax, drying aid, or rinse aid, which typically can be used in automatic vehicle washes. Other uses include enhancing the aesthetic appearance, improving the protection, or drying the surfaces of various substrates such as vehicle, metal, plastic, painted surfaces, rubber, leather, paper, wood, glass and the like. The emulsion compositions of the present invention are formulated to overcome the environmental consequences and deficiencies of the prior art compounds, such as lack of dewatering ability, toxicity, and the like. An important aspect of the invention involves improving the prior art hydrophobes, such as mineral seal oil, by incorporating polyisobutylenes, polyisobutylene derivatives, or isobutylene copolymers, or polybutene, which offer increased hydrophobicity, surface protection, and the like.

The purpose of treating car surfaces, in addition to improving their appearance, is to provide protection and to make them dry faster.

Figure 1:
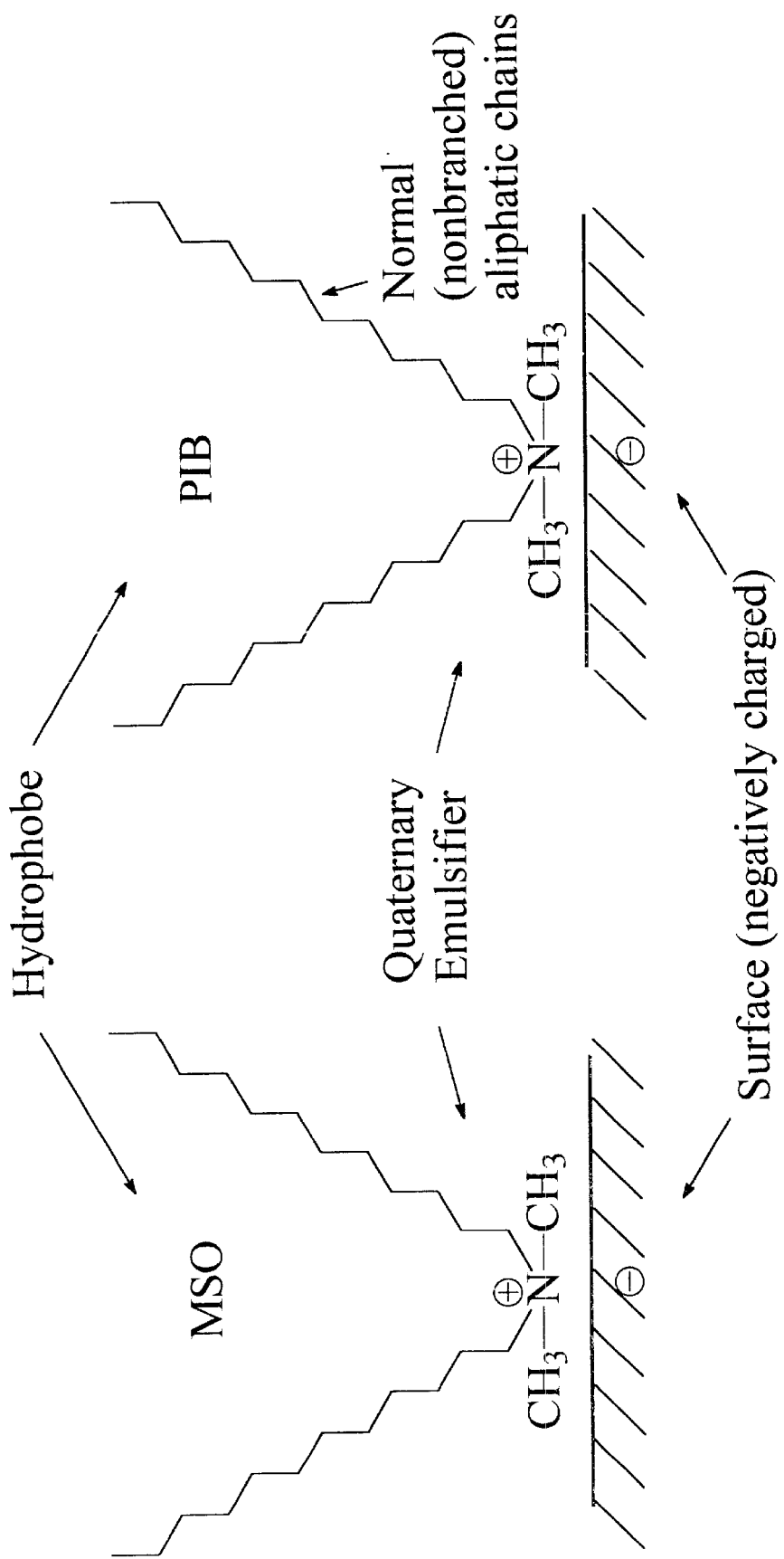
FIG. 1 shows hydrophobization of surfaces by plating out hydrophobes from microemulsions.

Increasing the hydrophobicity of the surfaces can attain these objectives. If a spraywax/drying agent, i.e. the emulsion or microemulsion compositions of the present invention, is sprayed onto a car's surface, the polar moiety of the cationic emulsifier contained in the formula electrostatically adheres to the polar metal surface, while the carbonaceous hydrophobic moiety protrudes away from the metal toward the air (air is a highly hydrophobic medium). The hydrophobe component of the emulsion is anchored to the surface by means of the hydrophobic moieties of the cationic emulsifier (hydrophobic attraction). FIG. 1 schematizes the alignment of the key ingredients of a spraywax/drying agent on a metallic surface. The more hydrophobic the ingredient that will be in contact with the air, the more hydrophobic the surface of the car will be.

To better quantify the hydrophobicity of various drying agents and spraywaxes we have developed methodology based on contact angle measurements. Contact angles characterize the interfacial tension between a solid, a liquid, and a vapor.

When water (a high surface tension liquid) is poured onto a solid hydrophobic surface (low surface energy surface), it tends to form droplets ("beading"). This phenomenon is due to intermolecular forces. Water molecules in the interior of the liquid are surrounded by other water molecules while those at the liquid surface are attracted only from the side and from below. This uneven pull causes the molecules on the surface to draw into the body of the liquid and thus to minimize the surface area. If the solid surface is of high surface energy which exceeds the surface tension of water, (e.g. clean glass, which contains oxygen atoms having partial negative charges that attract the positive end of polar water molecules), the surface area of the water will increase and the water will wet the surface. Thus, water deposited on polar or hydrophilic surfaces will spread out, it will be flat. In contrast, water on hydrophobic surfaces will tend to assume a spherical shape.

In order to define the profiles of droplets on surfaces it is common to draw a line tangent to the curve of the droplet at the point where the droplet touches the solid. The angle formed by this line and the solid surface is called the contact angle which can be easily determined and whose value quantitatively characterizes the interaction between a liquid and a substrate. The contact angle is not a property of the liquid or the substrate, but of the interaction between the two.

Contact angles vary greatly depending on the nature of the wetting liquid and the substrate; e.g. mercury (a high surface tension liquid) on teflon (a very low surface energy solid) exhibits a contact angle of 150 degrees, while the contact angle of water on a perfectly clean glass surface is close to 0 degrees.

A common technique to measure contact angles is by the Wilhelmy plate balance (See Wilhelmy, L. "Ueber die Abhangigkeit der Capillaritats-Constanten des Alkohols von Substanz und Gestalt des benetzten festen Korpers", Ann. Physik. (1863), 119, 177–217). In this non-destructive gravimetrical test, a geometrically well-defined flat plate with a known perimeter is immersed into a liquid with a known surface tension, and a microbalance is used to measure the force the liquid exerts on the plate while the plate is submerged or is withdrawn from the liquid. The contact angle forms at the surface of the liquid where the plate emerges. The force exerted on the liquid is related to the contact angle, the wetted perimeter, and the liquid's surface tension. The Wilhelmy plate technique is simple, reliable and the wetting behavior/contact angle data can easily be correlated with surface composition or surface treatment. In our measurements we have used a Cahn DCA-312 Dynamic Contact Angle Analyzer, available from Cahn Instruments, Inc. 5225 Verona Rd. Bldg. #1, Madison Wis. 53711 USA, to determine advancing contact angles (while the plate is immersed).

The disclosed compositions of the present invention are preferably microemulsions. Microemulsions are liquid dispersions with diameters in the colloidal range generally less than 400 nm, and more preferably in the range of 20–80 nm, so that they are typically clear and transparent. These dispersions may be either oil-in-water or water-in-oil systems. One of the main advantages of microemulsions relative to conventional solutions is that they maintain and exhibit the properties of both the hydrophobe and water. The microemulsions of the present invention generally comprise a hydrophobe component, an emulsifying component, optionally but desirably a solvent component, or water, or both, and optionally other desirable additives and fillers.

An important ingredient of the microemulsions of the present invention is the hydrophobe component. Aliphatic straight chain-, branched- and aromatic hydrocarbons show different affinities towards water. Branched hydrocarbons are more hydrophobic than straight chain hydrocarbons, saturated straight chain hydrocarbons are more hydrophobic than unsaturated ones, and aliphatic hydrocarbons are more hydrophobic than aromatic ones (the Π-electrons of the latter cause van der Waals attraction of water molecules). The higher hydrophobicity of the branched hydrocarbons relative to the straight chain hydrocarbons is due to the larger number of water molecules in contact with the branched hydrocarbons due to their larger surface areas.

The hydrophobe component of the present invention always contains a polyalkene derived from an alkene having from 3 to about 10 carbon atoms with a polyisobutylene component being highly preferred. The polyisobutylene components utilized in this invention include, but are not limited to, polyisobutylenes, polybutenes, polyisobutylene derivatives, isobutylene copolymers such as isobutylene/butene containing less than 50% and preferably less than 10% of hydrocarbon comonomer units such as styrene, substituted styrenes such as alpha-methylstyrene, and the like; ethylene, propylene; butadiene, isoprene, pyperylene, etc., and blends thereof. The polyisobutylene derivatives utilized in the present invention can contain various end groups, including saturated or unsaturated end groups with examples including, but not limited to, at least a methylpropenyl, halide, chlorosilyl, hydroxyl, amino, amido, cyano, vinyl, epoxy, carboxyl, ester, and succinic anhydride, and the like, or combinations thereof. The polyisobutylene derivatives can also include a moiety derived from an aliphatic or aromatic initiator residue.

The polyisobutylene component of the present invention generally has a number average molecular weight of from about 100 to about 3,000, desirably between about 150 to about 1,000, and preferably from about 200 to about 600.

In addition to the polyisobutylene component, the hydrophobe component can also optionally contain other non-polyisobutylene hydrophobes such as mineral seal oil, paraffinic or naphtenic mineral oil, vegetable oil, fuel oil, diesel oil, petroleum naphta grease, ester, fat, synthetic or natural wax, aliphatic and aromatic hydrocarbon, or a polymer such as, low molecular weight polypropylene, polyvinyl chloride, various fluoropolymers, various polysiloxanes, and the like, as well as combinations thereof. The amount of polyisobutylene component of the hydrophobe ranges generally from about 0.001, 0.05, 0.1, 0.5, 1, 2, 3, 4, 5, or 10 to about 100 parts by weight, desirably from about 10 or 25 to about 90 or 100 parts by weight, and preferably from about 40 or 50 to about 60, or 75, or 90, or 100 parts by weight, based on 100 parts by weight of the total hydrophobe component.

The hydrophobic microemulsions can be effectively used even if the hydrophobic component contains only less than 1 % of polyisobutylene or derivatives thereof, etc., as set forth above and an excess of other suitable polyhydrocarbons such as polypropylene, polyethylene, ethylenepropylene copolymers, polybutene-1, polypentene-1, and the like.

It is however recognized, that good hydrophobicity is attained by the use of large quantities of polyisobutylenes, its derivatives, etc.

Low molecular weight liquid polyisobutylene (PIB) or isobutylene-butene copolymers do not leave residue when volatized. They are highly hydrophobic and impermeable to water or gases, chemically inert, and transparent. They provide superior color stability on long exposure to ultraviolet light, (much more so than conventional mineral oils) and exhibit outstanding resistance to oxidation. These characteristics are especially important when comparing the behavior of PIB to natural waxes. The surfaces of natural waxes (esters of fatty acids and monohydroxy alcohols) are oxidized when exposed to UV light and/or oxygen; thus water will bead up less, because the surface is less hydrophobic. Furthermore polyisobutylenes are nontoxic, and meet U.S. FDA specifications for use in food contact applications.

The emulsion compositions of the present invention also, optionally, but desirably contain an emulsifying component which is responsible for plating the hydrophobe onto the desired surface. Such emulsifiers can generally be any cationic surfactant such as a quaternary ammonium salt or an ethoxylated amine; or a nonionic surfactant, or an amphoteric surfactant, and the like. The emulsifier component can be one emulsifier or a blend of various emulsifiers. Preferably, at least one of the emulsifiers should be cationic.

Suitable cationic emulsifiers include dicoco dimethyl ammonium chloride; ditallow dimethyl ammonium chloride; ester-based quaternary salts, or amido or diamido amine quaternary salts, various di-quaternary salts, and various ethoxylated quaternary salts. Other suitable cationic emulsifiers include ether amine quaternaries such as isodecyloxypropyl bis-[2-hydroxyethyl] methyl ammonium chloride available from Exxon Chemicals, Tomah Products Division of Milton, Wis. under the designation Q-14-2, and isotridecyloxypropyl dihydroxyethyl methyl ammonium chloride, available from Exxon Chemicals, Tomah Products Division, of Milton, Wis. under the designation Q-17-2. Another group of cationic emulsifiers include various fatty amine salts; imidazolines (oleyl, coco, tall oil, and lauric, imidazoline, etc.) and salts thereof; imidoamine salts; amine acetates; diamine diacetates; amine oxides; and the like, as well as combinations thereof. These and other cationic emulsifiers which can be utilized are set forth in Cationic Surfactants, Eric Jungermann, Marcel Dekker Inc. New York, N.Y., ISBN 0-8247-7199-0, 1969, which is hereby fully incorporated by reference.

Suitable nonionic surfactants/cosurfactants include, but are not limited to, fatty alcohols, polyethylene glycol ethers, oxo-alcohol polyethyleneglycol ethers, alkylphenol polyethyleneglycol ethers, fatty acid alkanol amides, fatty alcohol polyglycol ethers (EO/PO-Adducts), ethylene oxide/propylene oxide block polymers, ethoxylated amines, ethoxylated diamines, or alkyl dimethyl amine oxides, and combinations thereof.

The amphoteric emulsifiers include those known to the art and to the literature such as the various alkylamino butyric acids.

The emulsifiers can be used in an amount generally from about 1 to about 500, desirably from about 10 to about 200, and preferably from about 50 to about 150 parts by weight based on 100 parts by weight of the hydrophobe component.

The emulsion compositions of the present invention further include at least one solvent, which is used to aid emulsifying of incompatible fluids, i.e. the hydrocarbon component and water. The use of a solvent also prevents thickening and gelation when the emulsion is diluted with water. Such gelation can cause problems in automatic carwashes when it is desired to inject a concentrated spray wax or drying aid into a rinse water stream or even when just mixing a concentrate with water in a tank. Examples of suitable solvents include but are not limited to glycol ethers having a total of from 2 to about 20 carbon atoms and desirably from 5 to about 10 carbon atoms such as ethylene glycol n-butyl ether, dipropylene glycol methyl ether, diethylene glycol methyl ether, propylene glycol methyl ether, tripropylene glycol methyl ether, propylene glycol methyl ether acetate, dipropylene glycol methyl ether acetate, propylene glycol n-butyl ether, dipropylene glycol n-butyl ether, tripropylene glycol n-butyl ether, propylene glycol phenyl ether, propylene glycol n-propyl ether, triethylene glycol butyl ether/highers, triethylene glycol methyl ether/highers, ethylene glycol phenyl ether, and aromatic based glycol ether, and the like. Preferred glycol ethers include dipropylene glycol methyl ether, propylene glycol n-butyl ether and ethylene glycol n-butyl ether. Another group of suitable solvents are the various alcohols having from 1 to about 20 carbon atoms such as methyl alcohol, ethyl alcohol, propyl alcohol, isopropyl alcohol, butyl alcohol, isobutyl alcohol, amyl alcohol, and the like. The solvent utilized in the present invention ranges generally from about 0.1 to about 200 parts by weight, desirably from about 1.0 to about 50 parts by weight, and preferably from about 2 to about 20 parts by weight based on 100 parts by weight of the hydrophobe component utilized in the present invention.

Typically, emulsion compositions of the present invention are diluted with water. The water can be unsoftened, softened, distilled, ion exchanged, R.O. (reverse osmosis) water and the like. Water may not be utilized as when shipping a concentrate. However, when utilized, the amount thereof can vary widely depending upon the desired concentration, such as from about 1 to about 1 million or 10 million, and desirably from about 100 to about 100,000 parts by weight per 100 total parts by weight of the hydrophobe component.

In addition to these components, a variety of nonessential components, which are not critical to the performance, but may be advantageous in some applications, can be added. These materials include but are not restricted to rust inhibitors, dyes, UV absorbers, antifoam agents, antimicrobial agents, fragrances, sequestring agents, thickening agents, stabilizers, etc. These additional components when utilized each can be in any desired or effective amount such as generally from about 0.1 to about 100 or 200 parts by weight per 100 parts by weight of the hydrophobe component.

Water droplets on car surfaces ("beaded water") are commonly removed by a blower in an automated car wash. The shape of the water droplets is determined by the contact angle (see above).

Figure 2:
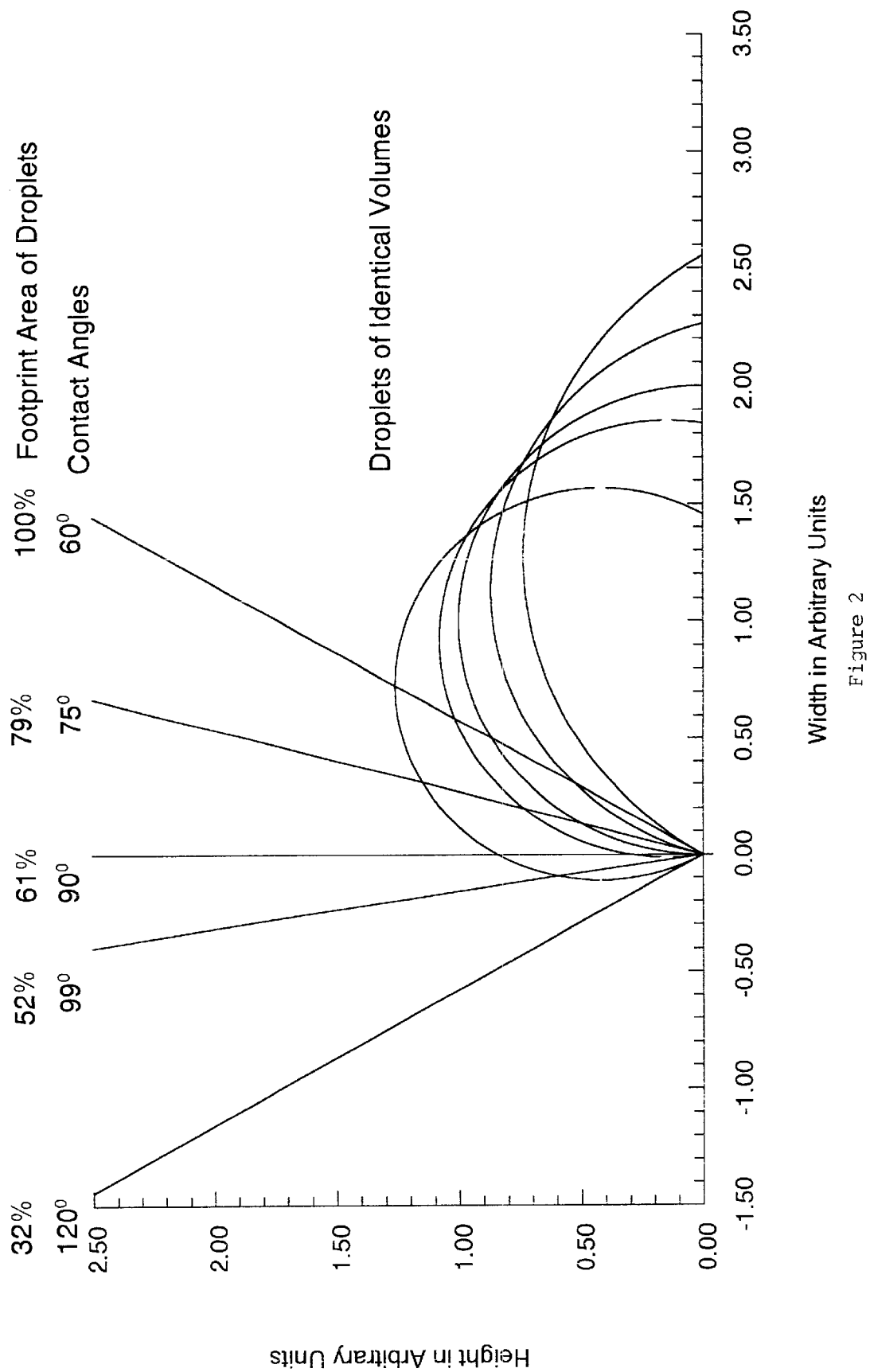
FIG. 2 shows the correlation between the shape of droplets and contact angles. For simplicity, the flattening effect of gravity is neglected.

FIG. 2 shows droplets of identical volumes and associated contact angles. (For simplicity, the flattening effect of gravity is neglected.) The larger the contact angle the taller are the droplets, and the smaller are the "footprint" of the droplets on the surface. If the droplet is taller, the perpendicular area to the direction of the airjet, the so-called "face area", will be larger. If the contact angle is larger, the footprint is smaller, which facilitates the removal of water by blowing it off from the surface.

The initial advancing contact angle of the present invention when measured in a manner as set forth herein below is generally at least about 95, desirably at least about 96, and preferably from about 97 or 98 or 99 to about 100, 101, 102, or 103.

Figure 3:
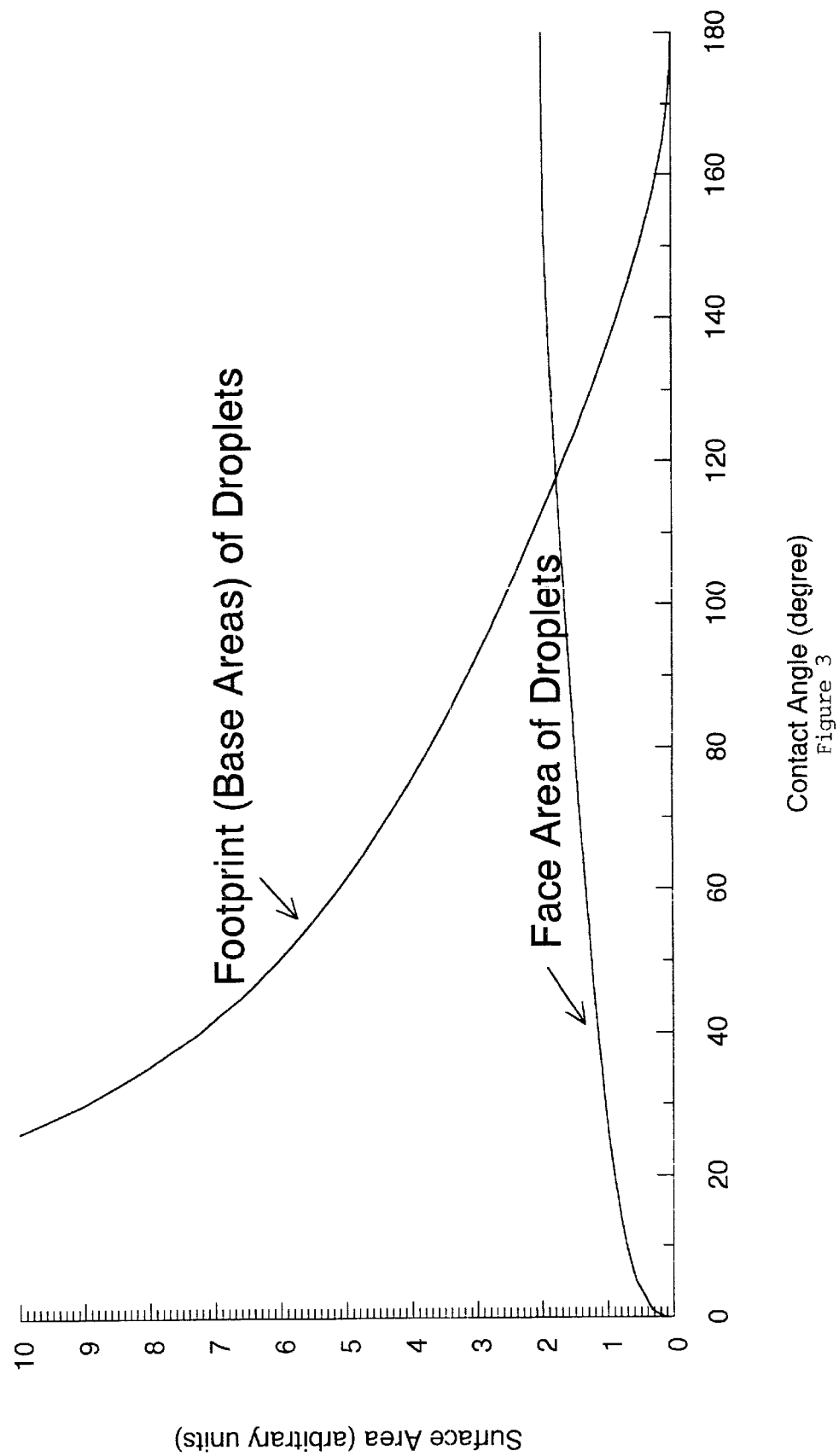
FIG. 3 shows footprints and face areas of droplets as a function of contact angles.

FIG. 3 shows the correlation between footprints (in arbitrary units) and contact angles. The airjet of the blower can more easily "grab" droplets with smaller footprints (less contact with the surface) and larger face areas (a larger force can be exerted by the air). For example, increasing the contact angle by about 10% (e.g. from 90 to 100 degree), the footprint area decreases by 20%, and the face area increases by 4.5% (see FIG. 3). This increase in the contact angle results in a 25% (1.2×1.045=1.25) improvement in the efficiency of the drying (dewatering) step. Thus, increasing the contact angle at the surface of the car is desirable. We have found that the contact angle can be increased by hydrophobizing surfaces.

The following examples serve to illustrate, but not to limit, the present invention.

EXAMPLES

TABLE A shows a comparison of selected properties between hydrophobes used in our examples.

TABLE A

|  | MSO<br>Mineral Seal Oil | PIB<br>Indopol L-14<br>(Amoco) |
|---|---|---|
| Specific gravity, at 15.5° C., (60° F.) | 0.838 | 0.83–0.845 |
| Viscosity, Brookfield at 38° C., (100° F.) cP | 5–8 | 25 |
| Refractive Index at 20° C. | 1.4665 | 1.4680 |
| Distillation Range, ° C. | 278–316 |  |
| Flash Point, Cleveland Open Cup, (° F.), ° C. | (265), 129 | (280), 138 |
| Solubility Parameter | 7.2 |  |
| Molecular Weight ($M_n$) (GPC) |  | 330–370 |

Description of the Experiments

A. Contact Angle Measurements:

Fisher Scientific Premium Cover Glass Plates (24×30× 0.15 mm, glass slide perimeter=48.3 mm) were used to measure the contact angles by employing a DCA 312 Cahn Dynamic Contact Angle Analyzer. The glass plates were cleaned in a blue oxidizing flame provided by a propane torch. The glass slides were cleaned by a few passes through the flame on each side and were cooled to room temperature prior to immersion into various test solutions. The contact angle of water on cleaned glass slides is 0 degrees.

Test solutions were prepared in a 250-ml beaker by the use of 100 g of solutions from the various formulas and distilled water. The concentration range of the formulas varied from 0.1% to 5%, representing dilution ratios of 1:1000 to 1:20, respectively. After immersing the glass slides into the test solutions for 60 seconds, they were slowly pulled out from the solutions and air-dried for 1 minute.

For contact angle measurements, a 50-ml beaker was used with 30.0 g of distilled water (Surface tension: 72.6 dynes/ cm). Immersion depth: 25 mm, unless otherwise indicated. Platform speed: 153.3 microns/sec. One cycle consists of a down and then an up movement of the slide relative to the balance (approximately 5 min) with an option to set a dwell time either at the beginning or end of a cycle. The dwell time was 5 minutes in experiments to mimic rainfall.

Immersion tests in conjunction with contact angle determinations were performed so as to compare quantitatively surfaces treated with different hydrophobe spraywax formulas, and to determine quantitatively a formula, which gives optimum length of protection.

Each immersion cycle takes about 5 minutes and one cycle is considered to be equivalent to a drenching rainfall.

B. Assessing the Drying Efficiency by Determining the Weight of Residual Water on Surfaces, and Measuring the Durability of Coats by Determining the Number of Rinsing Cycles:

Drying efficiency of microemulsions was assessed by determining the weight increase caused by absorbed water on stainless steel panels immersed in and withdrawn from water under controlled conditions. The dimensions of the steel panels were 137.0×87.0×0.3 mm. The wetted surface area of the steel plates was 90.0×87.0×0.3 mm on both sides of the panel, or a total of 0.01571 $m^2$.

Experiments were carried out by the use of two stainless steel panels. One panel was treated with the microemulsion spraywax containing MSO, the other with PIB. After 20 rinsing cycles, the panels were cleaned with a detergent and the experiment was repeated by switching the panels so that potential experimental errors deriving from panel geometry and/or surface differences would be eliminated. Experiments with untreated panels were also performed.

The plates were immersed into various microemulsions (drying solutions) for 60 seconds, slowly pulled out from the solutions with a pair of tweezers, and air dried for 10 minutes. Subsequently, to simulate rinsing, the metal plates were immersed intodistilled water and after about 1 second of immersion, they were removed from the water, allowed to drip-dry for 30 seconds and the weight increase was recorded. This constituted one immersion cycle. Cycles were repeated at least 20 times, and the weight increases of the steel plates were recorded. The weight increase of plates immersed in various drying solutions was compared to the weight increase measured on plates immersed into solution not containing PIB (control experiments). The immersion of the plates into distilled water was to simulate the wash off effect of a drenching rainfall.

Description of Results

A. Results of Contact Angle Measurements:

Various microemulsions were prepared for contact angle measurements. In these formulas dicoco-dimethyl ammonium chloride (Quat) was the cationic emulsifying agent, and ethylene glycol n-butyl ether (EB) was the solvent. The hydrophobe was varied from 100% weight mineral seal oil (MSO) to 100% weight polyisobutylene (PIB). The balance of the formulas was water.

Figure 4:
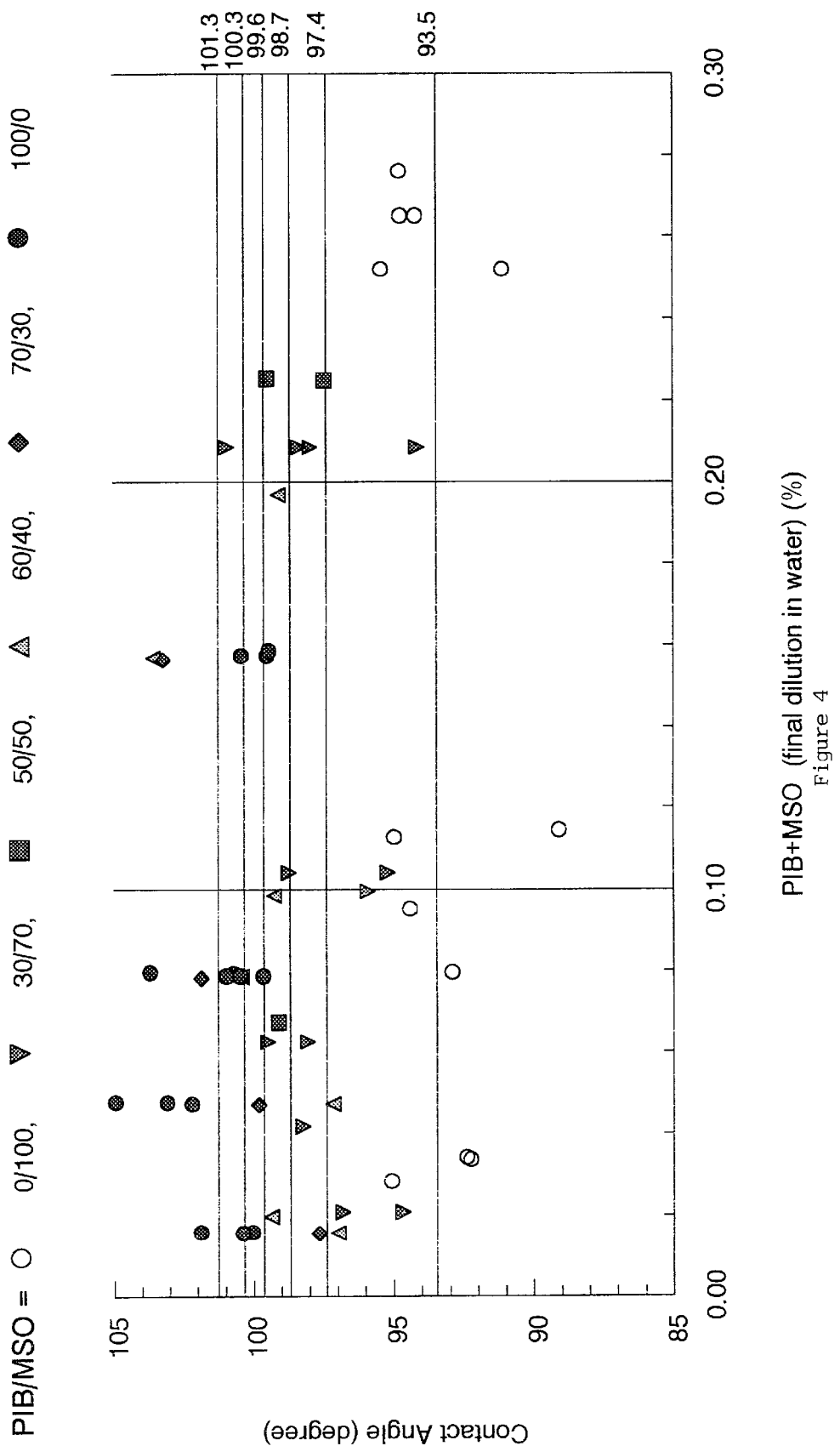
FIG. 4 shows contact angles as a function of total hydrophobe concentration at various polyisobutylene (PIB)/mineral seal oil (MSO) ratios in the spraywax/drying agent.

TABLE 1. shows contact angles obtained in experiments in which the hydrophobe was MSO. The final concentrations of MSO and Quat after diluting with water from 1:100 to 1:300 are also shown in weight percent. FIG. 4 shows the contact angles determined as a function of dilution with water in this concentration range. Although the final concentrations are different due to different dilution ratios, no significant dilution dependence on contact angles was found in the dilution range investigated. The average contact angle of the 12 repeat experiments at various dilutions is 93.5 degrees.

TABLE 1

| File Name | Contact Angle (degree) Cycle#1 | Final Concentration (%) PIB | MSO | Quat |
|---|---|---|---|---|
| Ex. 1 | 95.43 | 0.0000 | 0.2520 | 0.1390 |
| Ex. 2 | 91.12 | 0.0000 | 0.2520 | 0.1390 |
| Ex. 3 | 94.75 | 0.0000 | 0.2650 | 0.1256 |
| Ex. 4 | 92.92 | 0.0000 | 0.0796 | 0.0377 |
| Ex. 5 | 89.11 | 0.0000 | 0.1144 | 0.0618 |
| Ex. 6 | 92.42 | 0.0000 | 0.0343 | 0.0185 |
| Ex. 7 | 94.98 | 0.0000 | 0.1127 | 0.0697 |
| Ex. 8 | 92.27 | 0.0000 | 0.0338 | 0.0209 |
| Ex. 9 | 94.43 | 0.0000 | 0.0952 | 0.0856 |
| Ex. 10 | 95.09 | 0.0000 | 0.0286 | 0.0257 |
| Ex. 11 | 94.22 | 0.0000 | 0.2650 | 0.1256 |
| Ex. 12 | 94.79 | 0.0000 | 0.2760 | 0.1970 |
| Average: | 93.46 | | | |
| Standard Dev.: | 1.85 | | | |

In TABLE 2 the hydrophobe was a mixture of 70% MSO and 30% PIB:

TABLE 2

| File Name | Contact Angle (degree) Cycle#1 | Final Concentration (%) PIB | MSO | Quat |
|---|---|---|---|---|
| Ex. 13 | 95.92 | 0.0273 | 0.0723 | 0.0343 |
| Ex. 14 | 100.95 | 0.0625 | 0.1458 | 0.1479 |
| Ex. 15 | 99.50 | 0.0188 | 0.0437 | 0.0444 |
| Ex. 16 | 96.83 | 0.0063 | 0.0146 | 0.0148 |
| Ex. 17 | 94.15 | 0.0625 | 0.1458 | 0.1479 |
| Ex. 18 | 97.97 | 0.0625 | 0.1458 | 0.1479 |
| Ex. 19 | 95.20 | 0.0313 | 0.0729 | 0.0740 |
| Ex. 20 | 98.37 | 0.0625 | 0.1458 | 0.1479 |
| Ex. 21 | 98.75 | 0.0313 | 0.0729 | 0.0740 |
| Ex. 22 | 98.07 | 0.0188 | 0.0437 | 0.0444 |
| Ex. 23 | 94.68 | 0.0063 | 0.0146 | 0.0148 |
| Ex. 24 | 98.25 | 0.0126 | 0.0292 | 0.0296 |
| Average: | 97.39 | | | |
| Standard Dev.: | 1.97 | | | |

The average contact angle of the 12 repeat experiments at various dilutions is 97.4 degrees.
In TABLE 3 the hydrophobe was a mixture of 50% MSO and 50% PIB:

TABLE 3

| File Name | Contact Angle (degree) Cycle#1 | Final Concentration (%) PIB | MSO | Quat |
|---|---|---|---|---|
| Ex. 25 | 99.52 | 0.1126 | 0.1126 | 0.1600 |
| Ex. 26 | 97.46 | 0.1124 | 0.1124 | 0.1599 |
| Ex. 27 | 99.11 | 0.0337 | 0.0337 | 0.0480 |
| Average: | 98.70 | | | |
| Standard Dev.: | 0.89 | | | |

The average contact angle of the 3 repeat experiments at various dilutions is 98.7 degrees.
In TABLE 4 the hydrophobe was a mixture of 40% MSO and 60% PIB:

TABLE 4

| File Name | Contact Angle (degree) Cycle#1 | Final Concentration (%) PIB | MSO | Quat |
|---|---|---|---|---|
| Ex. 28 | 103.58 | 0.0944 | 0.0625 | 0.1270 |
| Ex. 29 | 100.42 | 0.0472 | 0.0313 | 0.0635 |
| Ex. 30 | 97.16 | 0.0282 | 0.0189 | 0.0381 |
| Ex. 31 | 96.98 | 0.0094 | 0.0063 | 0.0127 |
| Ex. 32 | 101.18 | 0.4720 | 0.3125 | 0.6350 |
| Average: | 99.86 | | | |
| Standard Dev.: | 2.51 | | | |

The average contact angle of the 5 repeat experiments at various dilutions is 99.9 degrees.
In TABLE 5 the hydrophobe was a mixture of 30% MSO and 70% PIB:

TABLE 5

| File Name | Contact Angle (degree) Cycle#1 | Final Concentration (%) PIB | MSO | Quat |
|---|---|---|---|---|
| Ex. 33 | 103.23 | 0.1099 | 0.0465 | 0.1303 |
| Ex. 34 | 99.06 | 0.5495 | 0.2325 | 0.6515 |
| Ex. 35 | 101.87 | 0.0550 | 0.0233 | 0.0652 |
| Ex. 36 | 99.83 | 0.0330 | 0.0140 | 0.0391 |
| Ex. 37 | 97.66 | 0.0110 | 0.0047 | 0.0130 |
| Average: | 100.33 | | | |
| Standard Dev.: | 1.99 | | | |

The average contact angle of the 5 repeat experiments at various dilutions is 100.3 degrees.
In TABLE 6 the hydrophobe was exclusively PIB:

TABLE 6

| File Name | Contact Angle (degree) Cycle#1 | Final Concentration (%) PIB | MSO | Quat |
|---|---|---|---|---|
| Ex. 38 | 99.67 | 0.0787 | 0.0000 | 0.0729 |
| Ex. 39 | 102.21 | 0.0472 | 0.0000 | 0.0437 |
| Ex. 40 | 103.71 | 0.0796 | 0.0000 | 0.0734 |
| Ex. 41 | 104.97 | 0.0477 | 0.0000 | 0.0440 |
| Ex. 42 | 101.89 | 0.0159 | 0.0000 | 0.0147 |
| Ex. 43 | 100.72 | 0.0793 | 0.0000 | 0.0734 |
| Ex. 44 | 103.10 | 0.0476 | 0.0000 | 0.0440 |
| Ex. 45 | 100.05 | 0.0159 | 0.0000 | 0.0147 |
| Ex. 46 | 100.38 | 0.0157 | 0.0000 | 0.0146 |
| Ex. 47 | 100.48 | 0.0787 | 0.0000 | 0.0729 |
| Ex. 48 | 100.98 | 0.0787 | 0.0000 | 0.0729 |
| Average: | 101.30 | | | |
| Standard Dev.: | 1.63 | | | |

The average contact angle of the 11 repeat experiments at various dilutions is 101.3 degrees.

FIG. 4 summarizes contact angles as a function of the total hydrophobe concentration at various hydrophobe compositions. According to the data the contact angles are independent of the total hydrophobe concentration, however, they significantly increase with increasing PIB content within the dilution range investigated. The horizontal lines represent average values of each set of data; the error of contact angle determination is ±2 degrees.

Figure 5:
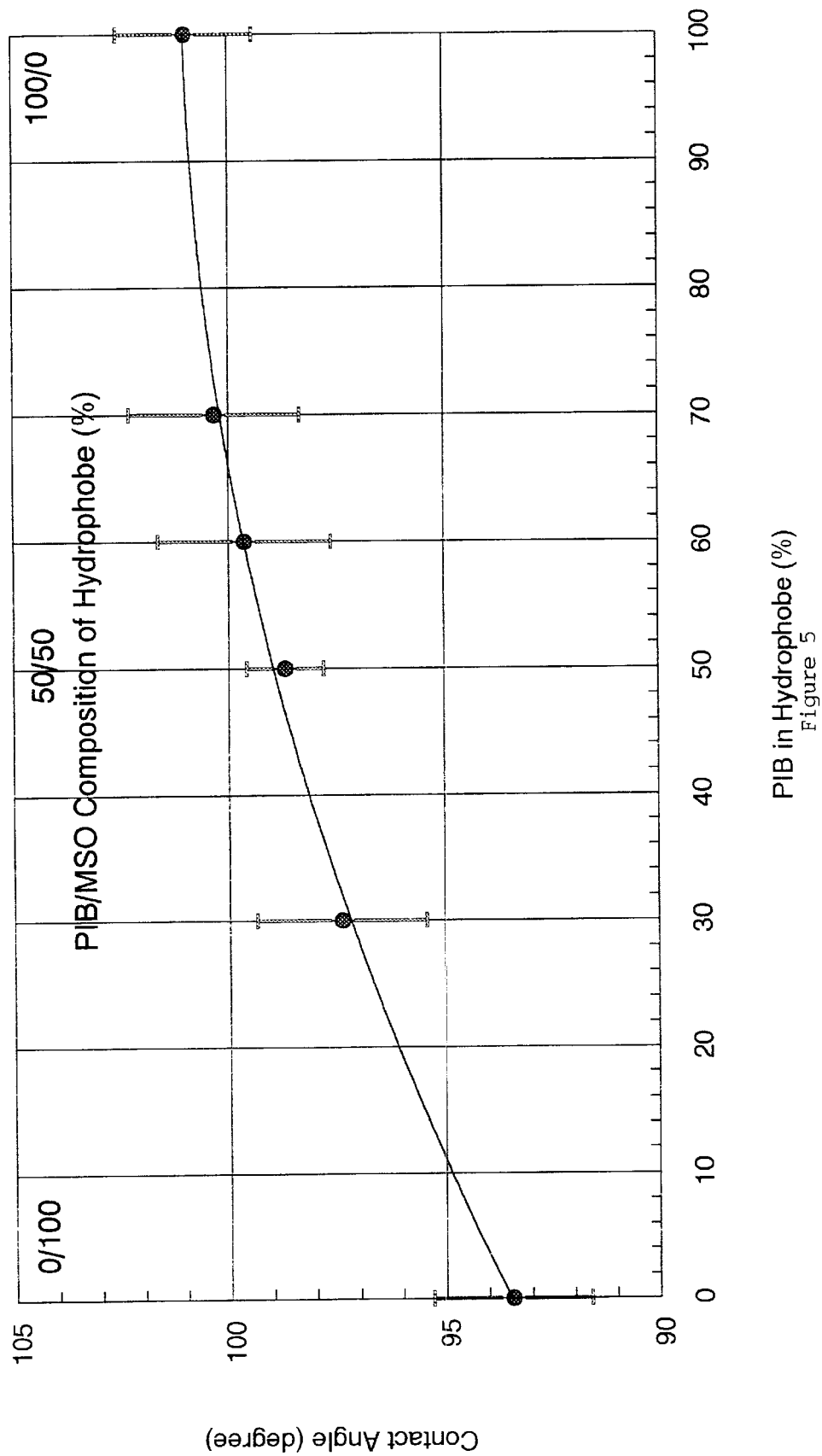
FIG. 5 shows average contact angles as a function of PIB content in the PIB/MSO hydrophobe (error limits indicated).

FIG. 5 shows the summary of contact angle experiments. It shows contact angles as a function of PIB content in the hydrophobe (PIB+MSO). Microemulsions containing only MSO show a contact angle of 93.5±2 degrees, whereas those containing only PIB show a contact angle of 101.3+2 degrees. Intermediate compositions show increasing contact angles with increasing PIB.

These series of examples demonstrate that mineral seal oil can be partially or totally substituted by polyisobutylene in spraywax microemulsions, and that the substitution of the mineral seal oil by polyisobutylene in microemulsions significantly increases the hydrophobicity of spraywaxes.

B. Drying Efficiency and Durability Testing:

TABLE 7 summarizes the results of 8 repeat contact angle examples carried out at various dilutions with microemulsions containing only MSO as the hydrophobe. The amounts of MSO and cationic emulsifier (Quat) are also given in the table. The averages of the experiments were recorded. Decreasing contact angles indicate loss of protection with increasing number of rinsing cycles.

TABLE 7

| Cycle # File Name | Contact Angle (degree) | | | | | | | | | | | | | Final Concentration (%) | | |
|---|---|---|---|---|---|---|---|---|---|---|---|---|---|---|---|---|
| | 1 | 2 | 3 | 4 | 5 | 6 | 7 | 9 | 01 | 11 | 12 | 13 | 14 | PIB | MSO | Quat |
| Ex. 49 | 95.43 | 74.43 | 74.89 | | | | | | | | | | | 0.0 | 0.2520 | 0.1390 |
| Ex. 50 | 91.12 | 88.38 | | | | | | | | | | | | 0.0 | 0.2520 | 0.1390 |
| Ex. 51 | 93.86 | 88.67 | 85.66 | 84.48 | 84.34 | 84.03 | 83.16 | | | | | | | 0.0 | 0.2520 | 0.1390 |
| Ex. 52 | 93.86 | 84.67 | 85.66 | 84.48 | 84.34 | 84.03 | 83.16 | | | | | | | 0.0 | 0.1520 | 0.0834 |
| Ex. 53 | 86.66 | 84.97 | 83.16 | 82.08 | 82.71 | 81.14 | 80.15 | | | | | | | 0.0 | 0.1520 | 0.0834 |
| Ex. 54–55 | 94.70 | 88.25 | 84.66 | 82.28 | 79.80 | 78.69 | 77.65 | 76.07 | 74.50 | 72.52 | 72.52 | 70.97 | 72.39 | 0.0 | 0.1520 | 0.0834 |
| Ex. 56–58 | 95.45 | 88.05 | 87.14 | 86.86 | 86.72 | 86.40 | 86.19 | 85.45 | 85.02 | 84.75 | 84.48 | 84.16 | 83.88 | 0.0 | 0.1520 | 0.0834 |
| Ex. 59–61 | 94.94 | 90.99 | 88.24 | 87.33 | 86.79 | 86.42 | 86.26 | 85.60 | 85.68 | 85.58 | 85.49 | 85.51 | 85.53 | 0.0 | 0.2520 | 0.1390 |
| Average | 93.25 | 86.55 | 84.20 | 84.59 | 84.12 | 83.45 | 82.76 | 82.37 | 81.73 | 80.95 | 80.83 | 80.21 | 80.60 | | | |

Table 8 summarizes the contact angles of microemulsions-containing only PIB as the hydrophobe. A total of 52 repeat experiments have been carried out and the averages recorded.

TABLE 8

| Cycle # File Name | Contact Angle (degree) | | | | | | | | | | |
|---|---|---|---|---|---|---|---|---|---|---|---|
| | 1 | 2 | 3 | 4 | 5 | 6 | 7 | 9 | 10 | 11 | 12 |
| Ex. 62 | 99.67 | 90.17 | 88.76 | | | | | | | | |
| Ex. 63 | 102.21 | 89.98 | 86.82 | | | | | | | | |
| Ex. 64 | 103.71 | 94.85 | 90.87 | | | | | | | | |
| Ex. 65 | 104.97 | 92.04 | 89.60 | | | | | | | | |
| Ex. 66 | 101.89 | 93.99 | 91.69 | | | | | | | | |
| Ex. 67 | 100.72 | 94.54 | 92.04 | | | | | | | | |
| Ex. 68 | 103.10 | 94.59 | 91.65 | | | | | | | | |
| Ex. 69 | 100.05 | 91.85 | 89.92 | | | | | | | | |
| Ex. 70 | 100.38 | 91.48 | 89.83 | | | | | | | | |
| Ex. 71 | 100.48 | 90.71 | 87.44 | | | | | | | | |
| Ex. 72 | 100.98 | 89.92 | 88.90 | | | | | | | | |
| Ex. 73 | 102.42 | 93.33 | 90.58 | | | | | | | | |
| Ex. 74 | 101.72 | 92.72 | 90.02 | | | | | | | | |
| Ex. 75 | 98.89 | 89.30 | 85.35 | | | | | | | | |
| Ex. 76 | 100.34 | 91.87 | 87.54 | | | | | | | | |
| Ex. 77 | 99.05 | 90.55 | 87.44 | | | | | | | | |
| Ex. 78 | 100.58 | 94.74 | 89.97 | | | | | | | | |
| Ex. 79 | 102.36 | 92.80 | 90.47 | | | | | | | | |
| Ex. 80 | 101.55 | 91.56 | 88.34 | | | | | | | | |
| Ex. 81 | 101.67 | 91.56 | 88.34 | | | | | | | | |
| Ex. 82 | 102.35 | 90.65 | 87.94 | | | | | | | | |
| Ex. 83 | 97.19 | 90.24 | 86.87 | | | | | | | | |
| Ex. 84 | 102.10 | 94.90 | 90.90 | | | | | | | | |
| Ex. 85 | 98.68 | 87.44 | 84.15 | | | | | | | | |
| Ex. 86 | 100.48 | 92.67 | 89.03 | | | | | | | | |
| Ex. 87 | 101.51 | 94.04 | 90.82 | | | | | | | | |
| Ex. 88 | 102.43 | 90.62 | 87.09 | | | | | | | | |
| Ex. 89 | 99.66 | 89.76 | 86.30 | | | | | | | | |
| Ex. 90 | 100.28 | 92.12 | 88.08 | | | | | | | | |
| Ex. 91 | 98.22 | 91.75 | 89.11 | | | | | | | | |
| Ex. 92 | 100.70 | 92.51 | 90.60 | | | | | | | | |
| Ex. 93 | 99.42 | 93.24 | 90.52 | | | | | | | | |
| Ex. 94 | 98.99 | 94.28 | 91.50 | | | | | | | | |

TABLE 8-continued

| | | | | | | | | | | | |
|---|---|---|---|---|---|---|---|---|---|---|---|
| Ex. 95 | 101.99 | 93.70 | 90.57 | | | | | | | | |
| Ex. 96 | 102.29 | 93.48 | 90.74 | | | | | | | | |
| Ex. 97 | 98.47 | 96.12 | 92.81 | | | | | | | | |
| Ex. 98 | 98.39 | 94.89 | 92.44 | | | | | | | | |
| Ex. 99 | | 94.78 | 93.84 | | | | | | | | |
| Ex. 100 | 99.17 | 90.91 | 87.23 | 86.17 | 85.10 | 84.12 | 83.55 | | | | |
| Ex. 101 | 99.60 | 91.00 | 85.97 | 86.17 | 85.10 | 84.12 | 83.55 | | | | |
| Ex. 102–103 | 101.02 | 94.68 | 90.62 | 88.99 | 87.60 | 87.49 | 87.05 | 86.26 | 85.92 | 85.59 | 85.26 |
| Ex. 104–106 | 100.04 | 94.52 | 89.71 | 87.77 | 86.96 | 86.44 | 86.65 | 85.31 | 84.53 | 84.36 | 83.90 |
| Ex. 107 | | 91.27 | 92.37 | 91.44 | 89.38 | 88.32 | 87.81 | | | | |
| Ex. 108–109 | 94.79 | 92.88 | 88.40 | 87.18 | 86.51 | 85.73 | 84.62 | 81.74 | 82.78 | 83.17 | 82.84 |
| Ex. 110 | 100.30 | 90.45 | 86.55 | 87.95 | 83.98 | 81.93 | 80.93 | | | | |
| Ex. 111–113 | 101.33 | 94.77 | 91.26 | 89.12 | 87.80 | 88.18 | 87.99 | 87.42 | 87.06 | 86.79 | 86.48 |
| Ex. 114–116 | 99.40 | 93.44 | 90.13 | 88.18 | 87.49 | 87.51 | 86.67 | 85.65 | 85.37 | 85.02 | 84.62 |
| Ex. 117–119 | 98.77 | 90.92 | 87.12 | 86.22 | 84.91 | 83.68 | 83.00 | 81.80 | 81.94 | 81.81 | 81.76 |
| Ex. 120–122 | 99.00 | 92.09 | 90.62 | 88.56 | 87.17 | 86.35 | 86.06 | 86.41 | 86.81 | 86.77 | 86.64 |
| Ex. 123–124 | 101.23 | 93.96 | 90.47 | 88.78 | 87.83 | 87.62 | 87.00 | 85.56 | 85.31 | 84.62 | 84.39 |
| Ex. 125 | 100.34 | 96.78 | 93.79 | 92.81 | 90.79 | 89.30 | 88.32 | | | | |
| Ex. 126–128 | 100.30 | 96.27 | 93.73 | 91.60 | 90.82 | 89.82 | 88.69 | 88.18 | 87.71 | 87.55 | 87.20 |
| Average: | 100.50 | 92.57 | 89.55 | 88.51 | 87.25 | 86.47 | 85.85 | 85.37 | 85.27 | 85.05 | 84.79 |

| Cycle # File Name | Contact Angle (degree) | | | | | | | | Final Concentration (%) | | |
|---|---|---|---|---|---|---|---|---|---|---|---|
| | 13 | 14 | 16 | 17 | 18 | 19 | 20 | 21 | PIB | MSO | Quat |
| Ex. 62 | | | | | | | | | 0.0787 | 0.0000 | 0.0729 |
| Ex. 63 | | | | | | | | | 0.0472 | 0.0000 | 0.0437 |
| Ex. 64 | | | | | | | | | 0.0796 | 0.0000 | 0.0734 |
| Ex. 65 | | | | | | | | | 0.0477 | 0.0000 | 0.0440 |
| Ex. 66 | | | | | | | | | 0.0159 | 0.0000 | 0.0147 |
| Ex. 67 | | | | | | | | | 0.0793 | 0.0000 | 0.0734 |
| Ex. 68 | | | | | | | | | 0.0476 | 0.0000 | 0.0440 |
| Ex. 69 | | | | | | | | | 0.0159 | 0.0000 | 0.0147 |
| Ex. 70 | | | | | | | | | 0.0157 | 0.0000 | 0.0146 |
| Ex. 71 | | | | | | | | | 0.0787 | 0.0000 | 0.0729 |
| Ex. 72 | | | | | | | | | 0.0787 | 0.0000 | 0.0729 |
| Ex. 73 | | | | | | | | | 0.0610 | 0.0000 | 0.0565 |
| Ex. 74 | | | | | | | | | 0.0610 | 0.0000 | 0.0565 |
| Ex. 75 | | | | | | | | | 0.0122 | 0.0000 | 0.0113 |
| Ex. 76 | | | | | | | | | 0.0366 | 0.0000 | 0.0339 |
| Ex. 77 | | | | | | | | | 0.0610 | 0.0000 | 0.0565 |
| Ex. 78 | | | | | | | | | 0.1220 | 0.0000 | 0.1130 |
| Ex. 79 | | | | | | | | | 0.0610 | 0.0000 | 0.0565 |
| Ex. 80 | | | | | | | | | 0.1220 | 0.0000 | 0.1130 |
| Ex. 81 | | | | | | | | | 0.1184 | 0.0000 | 0.1176 |
| Ex. 82 | | | | | | | | | 0.0592 | 0.0000 | 0.0588 |
| Ex. 83 | | | | | | | | | 0.0355 | 0.0000 | 0.0353 |
| Ex. 84 | | | | | | | | | 0.0118 | 0.0000 | 0.0118 |
| Ex. 85 | | | | | | | | | 0.0355 | 0.0000 | 0.0353 |
| Ex. 86 | | | | | | | | | 0.0592 | 0.0000 | 0.0588 |
| Ex. 87 | | | | | | | | | 0.1184 | 0.0000 | 0.1176 |
| Ex. 88 | | | | | | | | | 0.0592 | 0.0000 | 0.0588 |
| Ex. 89 | | | | | | | | | 0.0118 | 0.0000 | 0.0118 |
| Ex. 90 | | | | | | | | | 0.0118 | 0.0000 | 0.0118 |
| Ex. 91 | | | | | | | | | 0.1184 | 0.0000 | 0.1176 |
| Ex. 92 | | | | | | | | | 0.0355 | 0.0000 | 0.0353 |
| Ex. 93 | | | | | | | | | 0.0355 | 0.0000 | 0.0353 |
| Ex. 94 | | | | | | | | | 0.1220 | 0.0000 | 0.1130 |
| Ex. 95 | | | | | | | | | 0.0610 | 0.0000 | 0.0565 |
| Ex. 96 | | | | | | | | | 0.1220 | 0.0000 | 0.1130 |
| Ex. 97 | | | | | | | | | 0.0610 | 0.0000 | 0.0565 |
| Ex. 98 | | | | | | | | | 0.0336 | 0.0000 | 0.0339 |
| Ex. 99 | | | | | | | | | 0.1220 | 0.0000 | 0.1130 |
| Ex. 100 | | | | | | | | | 0.1220 | 0.0000 | 0.1130 |
| Ex. 101 | | | | | | | | | 0.1220 | 0.0000 | 0.1130 |
| Ex. 102–103 | 84.90 | 84.45 | | | | | | | 0.1220 | 0.0000 | 0.1130 |
| Ex. 104–106 | 83.40 | 82.99 | 82.12 | 81.82 | 81.53 | 81.07 | 80.78 | 80.20 | 0.0610 | 0.0000 | 0.0565 |

TABLE 8-continued

| | | | | | | | | | | | |
|---|---|---|---|---|---|---|---|---|---|---|---|
| Ex. 107 | | | | | | | | | 0.6100 | 0.0000 | 0.5650 |
| Ex. 108–109 | 82.66 | 82.98 | | | | | | | 0.2440 | 0.0000 | 0.2260 |
| Ex. 110 | | | | | | | | | 0.0366 | 0.0000 | 0.0339 |
| Ex. 111–113 | 86.39 | 86.23 | 85.49 | 85.45 | 85.57 | 85.45 | 85.86 | 85.95 | 0.0366 | 0.0000 | 0.0339 |
| Ex. 114–116 | 84.47 | 84.12 | 83.22 | 83.03 | 82.67 | 82.33 | 82.15 | 81.87 | 0.1220 | 0.0000 | 0.1130 |
| Ex. 117–119 | 81.72 | 81.61 | 80.56 | 80.61 | 80.00 | 80.10 | 79.77 | 79.60 | 0.1220 | 0.0000 | 0.1130 |
| Ex. 120–122 | 86.57 | 86.39 | 86.34 | 86.29 | 86.48 | 86.52 | 86.61 | 86.71 | 0.1220 | 0.0000 | 0.1130 |
| Ex. 123–124 | 83.97 | 83.48 | | | | | | | 0.1220 | 0.0000 | 0.1130 |
| Ex. 125 | | | | | | | | | 0.1220 | 0.0000 | 0.1130 |
| Ex. 126–128 | 86.91 | 86.69 | 86.55 | 86.72 | 86.80 | 86.64 | 86.40 | 86.20 | 0.1220 | 0.0000 | 0.1130 |
| Average: | 84.55 | 84.33 | 84.05 | 83.99 | 83.84 | 83.69 | 83.60 | 83.42 | | | |

Table 9 summarizes contact angles of emulsifier solutions obtained in the absence of a hydrophobe. A total of 3 repeat experiments have been carried out and the averages are recorded.

TABLE 9

| Cycle # File Name | Contact Angle (degree) | | | | | | | | | | |
|---|---|---|---|---|---|---|---|---|---|---|---|
| | 1 | 2 | 3 | 4 | 5 | 6 | 7 | 9 | 10 | 11 | 12 |
| Ex. 129 | 73.88 | 80.10 | 77.64 | | | | | | | | |
| Ex. 130 | 88.22 | 85.91 | 83.32 | | | | | | | | |
| Ex. 131–133 | 72.36 | 75.18 | 78.38 | 78.69 | 78.92 | 79.68 | 80.17 | 80.14 | 79.27 | 78.95 | 77.78 |
| Average | 78.15 | 80.40 | 79.78 | 78.69 | 78.92 | 79.68 | 80.17 | 80.14 | 79.27 | 78.95 | 77.78 |

| Cycle # File Name | Contact Angle (degree) | | | | | | | | Final Concentration (%) | | |
|---|---|---|---|---|---|---|---|---|---|---|---|
| | 13 | 14 | 16 | 17 | 18 | 19 | 20 | 21 | PIB | MSO | Quat |
| Ex. 129 | | | | | | | | | 0.0000 | 0.0000 | 0.1000 |
| Ex. 130 | | | | | | | | | 0.0000 | 0.0000 | 0.1000 |
| Ex. 131–133 | 77.01 | 76.56 | 75.70 | 75.19 | 74.64 | 74.45 | 74.40 | 73.79 | 0.0000 | 0.0000 | 0.1000 |
| Average | 77.01 | 76.56 | 75.70 | 75.19 | 74.64 | 74.45 | 74.40 | 73.79 | | | |

Figure 6:
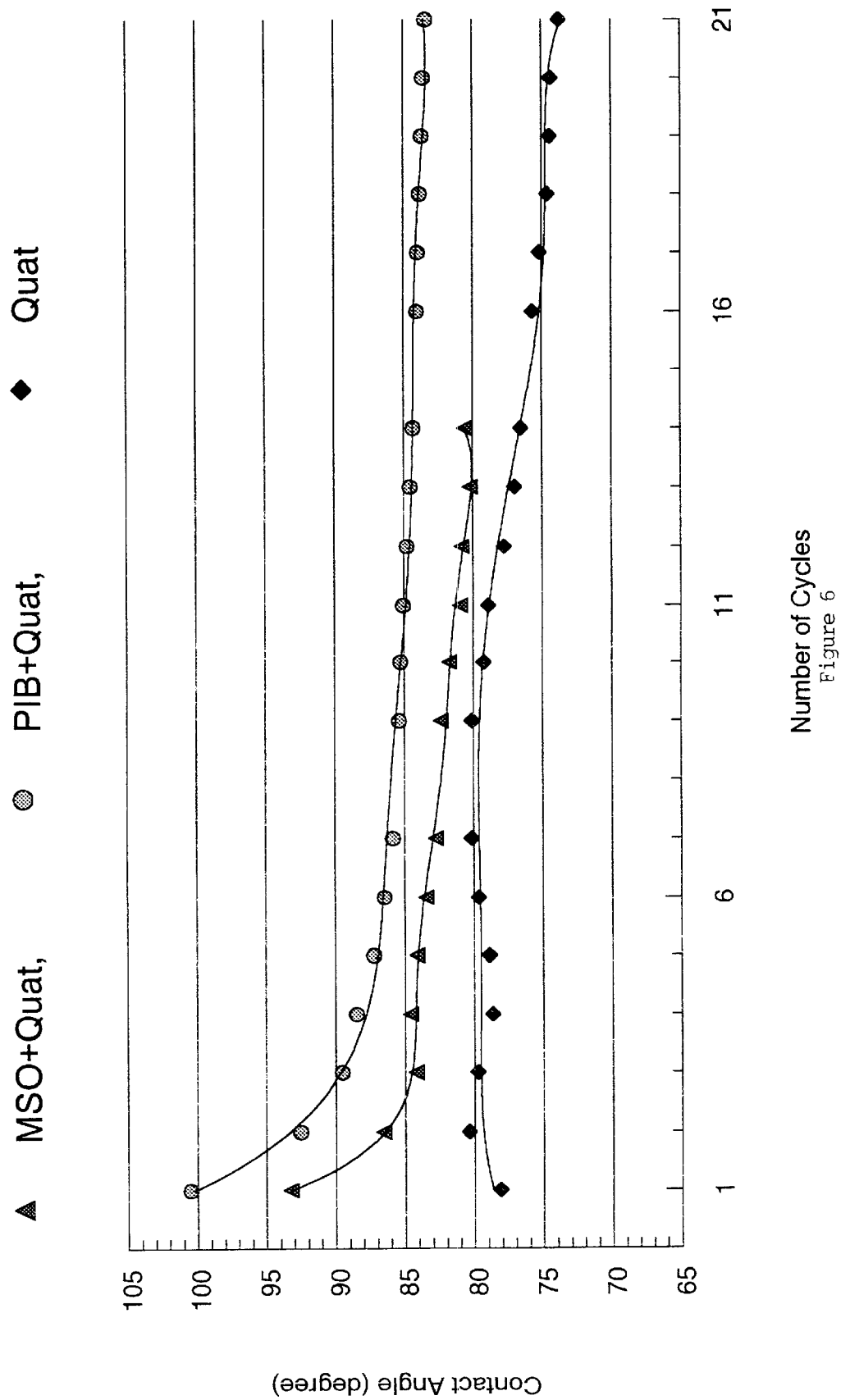
FIG. 6 shows a measure of durability of coatings of various spraywax/drying agent systems: Contact angles versus number of rinsing cycles. Quat=cationic emulsifier.

FIG. 6 summarizes the results of these durability tests carried out with two different spraywax microemulsions and of a cationic emulsifier (Quat). The contact angles are plotted against the number of immersion cycles. For details, see "Description of Experiments".

As one can see, the microemulsions containing PIB exhibit the highest initial contact angles and these formulas remain significantly superior to the other microemulsions throughout the cycles. The second best microemulsion is that containing MSO.

The "Quat" emulsifier dispersion shows the lowest performance, which is not surprising since it does not contain an added hydrophobe.

Surprisingly, the PIB microemulsions are superior to the other formulations even after more than 20 immersion cycles (mimicking 20 drenching rainfalls).

Drying Efficiency by Weight Determination: Results of Gravimetric Experiments:

TABLE 10 summarizes the results of gravimetric experiments. The lowest amount of weight increase is desirable, i.e., the more hydrophobic the surface, the less water adheres to it.

For details, see the Description of Experiments.

TABLE 10

| | Weight Increase (g/m$^2$) | | | | |
|---|---|---|---|---|---|
| Immersion | MSO + Quat | | PIB + Quat | | Untreated |
| Cycles | Plate 1 | Plate 2 | Plate 1 | Plate 2 | Plate 1 |
| 1 | 8.94 | 5.75 | 5.11 | 10.22 | 44.06 |
| 2 | 12.13 | 11.49 | 4.47 | 5.11 | 43.42 |
| 3 | 11.49 | 10.86 | 9.58 | 10.86 | 44.06 |
| 4 | 12.77 | 12.77 | 5.75 | 5.11 | 46.62 |
| 5 | 9.58 | 9.58 | 8.30 | 10.86 | 49.81 |
| 6 | 11.49 | 8.94 | 7.66 | 6.39 | 49.17 |
| 7 | 12.13 | 13.41 | 5.75 | 12.13 | 35.12 |
| 8 | 13.41 | 12.77 | 7.66 | 6.39 | 50.45 |
| 9 | 12.13 | 14.69 | 7.66 | 8.30 | 44.70 |
| 10 | 11.49 | 12.77 | 9.58 | 7.66 | 49.17 |
| 11 | 16.60 | 16.60 | 7.02 | 10.22 | 50.45 |
| 12 | 12.13 | 13.41 | 13.41 | 7.66 | 37.68 |

TABLE 10-continued

| Immersion Cycles | Weight Increase (g/m²) | | | | |
|---|---|---|---|---|---|
| | MSO + Quat | | PIB + Quat | | Untreated |
| | Plate 1 | Plate 2 | Plate 1 | Plate 2 | Plate 1 |
| 13 | 22.99 | 14.05 | 5.75 | 8.30 | 41.51 |
| 14 | 17.24 | 17.24 | 8.30 | 9.58 | 48.53 |
| 15 | 18.52 | 17.88 | 6.39 | 7.02 | 49.81 |
| 16 | 12.13 | 12.77 | 13.41 | 9.58 | 47.89 |
| 17 | 15.33 | 21.71 | 5.75 | 8.30 | 39.59 |
| 18 | 23.63 | 12.13 | 12.77 | 7.66 | 44.06 |
| 19 | 24.27 | 15.96 | 3.83 | 8.30 | 45.98 |
| 20 | 31.93 | 25.54 | 5.11 | 7.02 | 46.62 |
| Average: | 15.52 | 14.02 | 7.66 | 8.33 | 45.43 |

Figure 7:
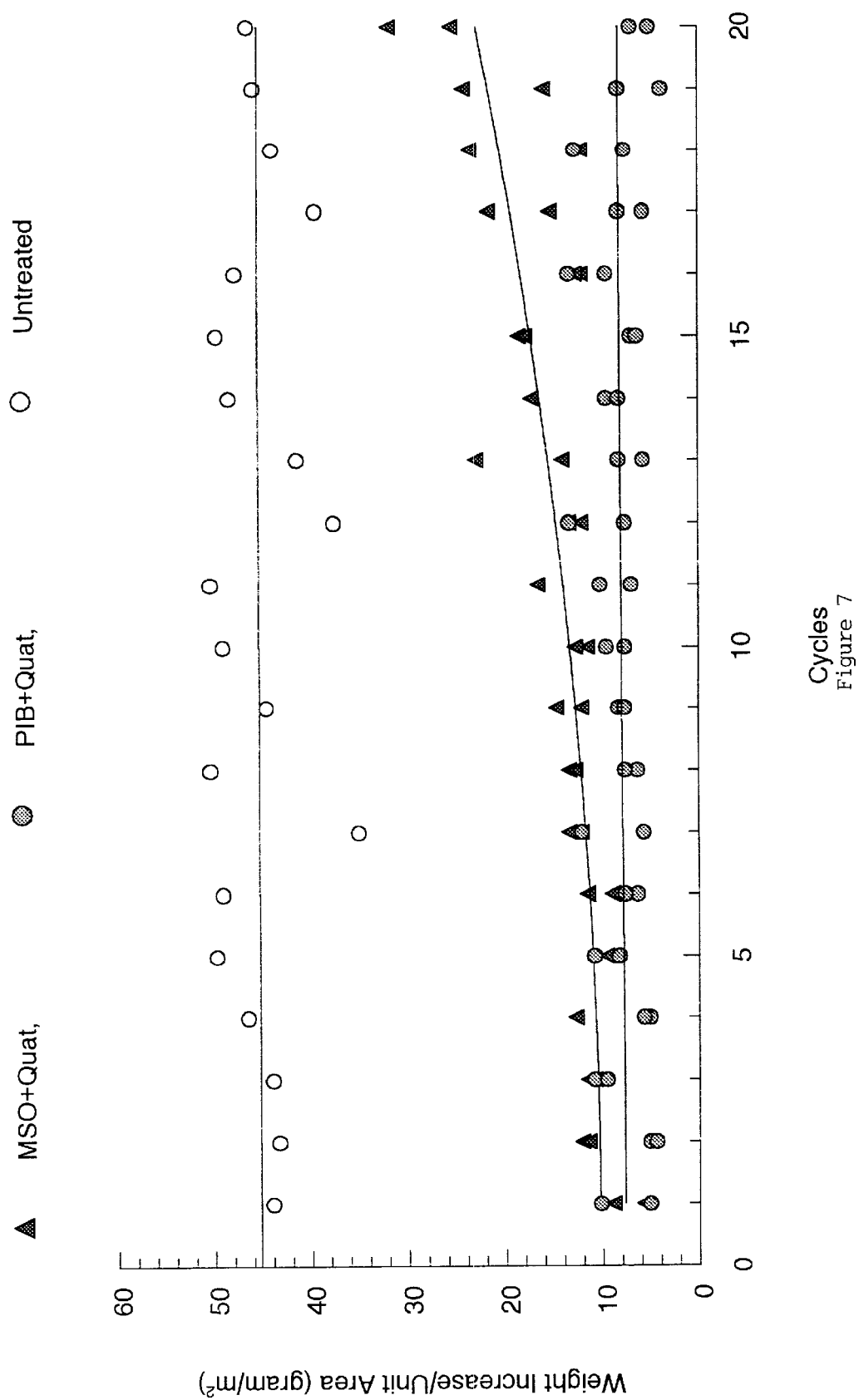
FIG. 7 shows dewatering efficiency: Weight of residual water on untreated and treated metal plates as a function of immersion cycles into water.

FIG. 7 shows the weight increase of test panels due to adhered water as a function of rinsing cycles by plotting weight increase/unit surface area against the number of immersion rinsing cycles. The weight increase of untreated panels (empty circles) was the highest and the weight increases were independent of the number of rinsing cycles. Microemulsions containing MSO plus Quat showed relatively higher weight increases and the weight increases increased as a function of the number of rinsing cycles. In contrast, panels protected by microemulsions containing PIB plus Quat showed the least weight increase and the weight increases remained constant even after 20 immersion cycles. Evidently, microemulsions containing MSO are less durable than those containing PIB, and their protective action diminishes noticeably with rinsing (increasing number of rinsing cycles).

Figure 8:
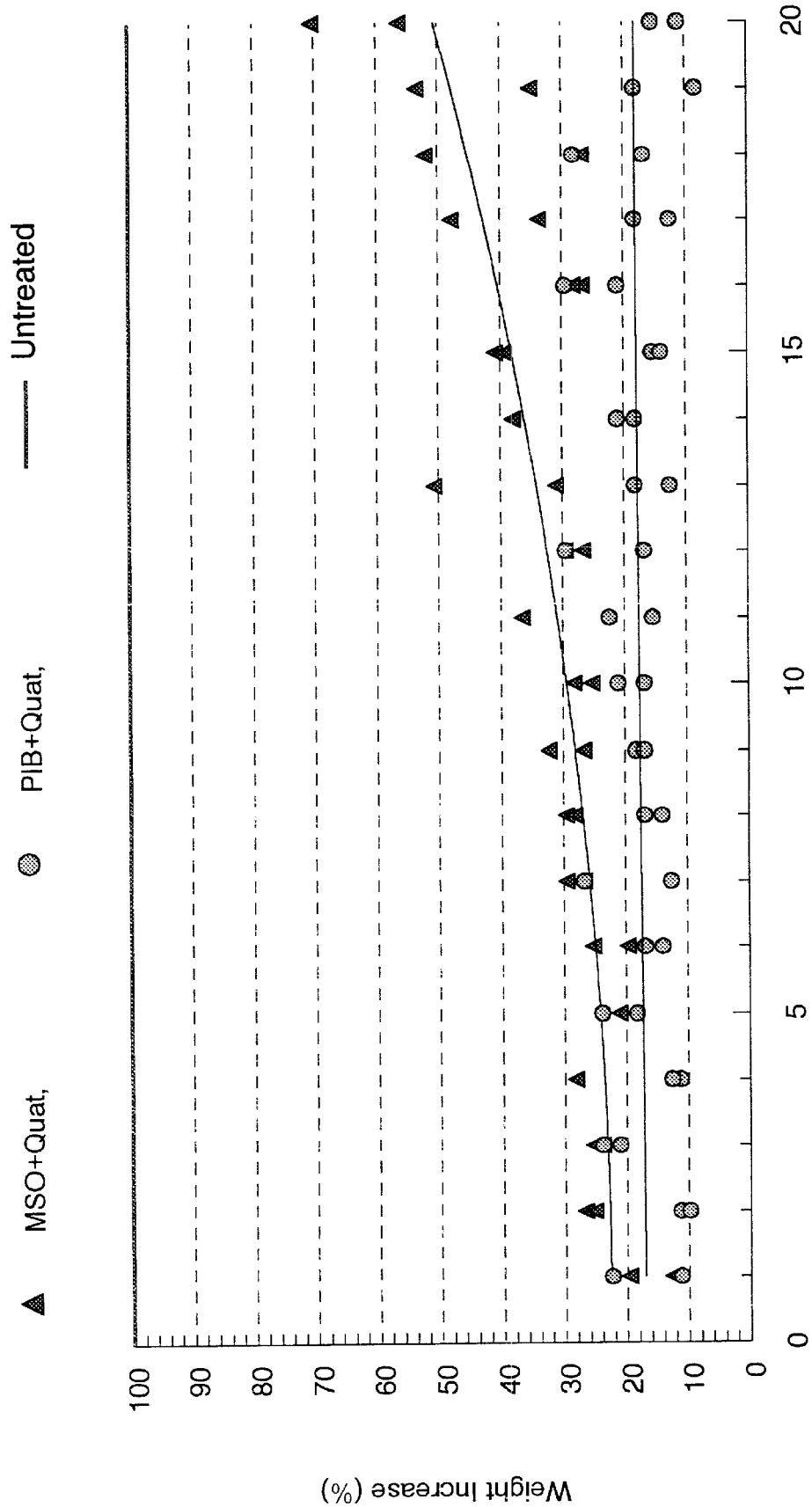
FIG. 8 shows drying efficiency: Weight increase (%) on surfaces treated with microemulsions containing MSO or PIB hydrophobes relative to untreated surfaces as a function of immersion cycles into water.

FIG. 8 expresses percentages of weight increases relative to those of "untreated" panels (100%). After 20 immersion rinsing cycles (mimicking the effects of 20 drenching rainfalls) the microemulsions containing PIB still provide better than 80% drying efficiency (less than 20% weight increase relative to the untreated panels) whereas the microemulsions containing MSO attain only about 50% drying efficiency.

Polyisobutylene in Various Microemulsions

Polyisobutylenes were incorporated into microemulsions in combination with a variety of other ingredients to find improved vehicle spraywax/drying agent systems.
The following ingredients were used in the examples:
  PIBB denotes Glissopal 550 (BASF), Mn about 600.
  PIB/PIBB is a mixture of polyisobutylenes/polybutenes of various molecular weights.
  PIBA stands for amino-functional polyisobutylenes such as Kerocom PIBA (BASF), ($M_n$ about 600)[1].
  Telechelic (end-functional) amino-functional polyisobutylenes are published in Kennedy, J. P. et al., *Polymer Bulletin*, 9 27–32, (1983),
  PIBB is an epoxidized polybutene such as Vikopol 24 (Elf Atochem)[2] or Actipol E6 (Amoco) ($M_n$ about 365)[3].
  Fluoro polymer denotes APG-232D, a nonionic fluoropolymer emulsion (Advanced Polymer, Inc.)[4].
  Silicones denote D.C. 1716 cationic microemulsion[5], or D.C. 929 cationic emulsion (Dow Corning)[6] or SF 1706 aminoethyl aminopropyl polysiloxane (General Electric)[7].
  EB denotes ethylene glycol n-butyl ether, e.g. Dowanol EB (Dow) DPM stands for dipropylene glycol methyl ether, e.g. Dowanol DPM (Dow)[8].
  Quat is dicoco dimethyl ammonium chloride or other appropriate cationic emulsifier such as Carspray 300, Carspray 400, Carspray 650 (Sherex, Witco), or Emulsifier 4 (Tomah) or mixture of those.
  Quat2 is a cationic emulsifier such as Q-14-2 (Tomah).
  Nonionic denotes alkoxylated alcohol or other appropriate nonionic surfactant/emulsifier, e.g., Desonic 81-6 (Witco).

[1] Kumnier, R. et al., U.S. Pat. No. 4,832,702
[2] Elf Atochem Technical Bulletin and MSDS: Vikopol Epoxidized Polybutene
[3] Amoco Technical Bulletin AB-2: Actipol Activated Polybutene
[4] Advanced Polymer, Inc. Technical Information: APG-232D Emulsion
[5] Dow Corning Technical Information: Silicone Emulsions: 1716 Microemulsion
[6] Dow Coming Technical Information: Polish Ingredients: 929 Cationic Emulsion
[7] General Electric Technical Information: Silicone Specialties for Household Care
[8] The Dow Chemical Company: The Glycol Ethers Handbook, pages: 9–12.

TABLE 11 shows contact angles obtained in durability tests with microemulsions containing both PIB and PIBB as hydrophobes. A total of 13 repeat examples have been carried out and the averages are recorded.

TABLE 11

| Cycle # File | Contact Angle (degree) | | | Final Concentration (%) | | |
|---|---|---|---|---|---|---|
| Name | 1 | 2 | 3 | PIB | Quat | PIBB |
| Ex. 134 | 101.67 | 91.56 | 88.34 | 0.1184 | 0.1176 | 0.0097 |
| Ex. 135 | 102.35 | 90.56 | 87.94 | 0.0592 | 0.0588 | 0.0049 |
| Ex. 136 | 97.19 | 90.24 | 86.87 | 0.0355 | 0.0353 | 0.0029 |
| Ex. 137 | 102.10 | 94.90 | 90.90 | 0.0118 | 0.0118 | 0.0010 |
| Ex. 138 | 98.68 | 87.44 | 84.15 | 0.0355 | 0.0353 | 0.0029 |
| Ex. 139 | 100.48 | 92.67 | 89.03 | 0.0592 | 0.0588 | 0.0049 |
| Ex. 140 | 101.51 | 94.04 | 90.82 | 0.1184 | 0.1176 | 0.0097 |
| Ex. 141 | 102.43 | 90.62 | 87.09 | 0.0592 | 0.0588 | 0.0049 |
| Ex. 142 | 99.66 | 89.76 | 86.30 | 0.0118 | 0.0118 | 0.0010 |
| Ex. 143 | 100.28 | 92.12 | 88.08 | 0.0118 | 0.0118 | 0.0010 |
| Ex. 144 | 98.22 | 91.75 | 89.11 | 0.1184 | 0.1176 | 0.0097 |
| Ex. 145 | 100.70 | 92.51 | 90.60 | 0.0355 | 0.0353 | 0.0029 |
| Ex. 146 | 99.42 | 93.24 | 90.52 | 0.0355 | 0.0353 | 0.0029 |
| Average | 100.36 | 91.65 | 88.44 | | | |

TABLE 12 represents contact angles obtained in durability tests with microemulsions containing DPM as solvent/cosurfactant. A total of 2 repeat experiments have been carried out and the averages are recorded.

TABLE 12

| Cycle # File | Contact Angle (degree) | | | | | | | Final Concentration (%) | |
|---|---|---|---|---|---|---|---|---|---|
| Name | 1 | 2 | 3 | 4 | 5 | 6 | 7 | PIB | Quat |
| Ex. 147 | 99.07 | 90.79 | 88.07 | 86.77 | 85.87 | 84.85 | 83.80 | 0.1222 | 0.1114 |

TABLE 12-continued

| Cycle # File Name | Contact Angle (degree) | | | | | | | Final Concentration (%) | |
|---|---|---|---|---|---|---|---|---|---|
| | 1 | 2 | 3 | 4 | 5 | 6 | 7 | PIB | Quat |
| Ex. 148 | 100.20 | 90.02 | 88.32 | 86.58 | 86.04 | 86.24 | 86.52 | 0.1190 | 0.1247 |
| Average | 99.64 | 90.41 | 88.20 | 86.68 | 85.96 | 85.55 | 85.16 | | |

TABLE 13 shows contact angles obtained in a durability test with a microemulsion containing both PIB and PIBB as hydrophobes in DPM solvent/cosurfactant.

TABLE 13

| Cycle # File Name | Contact Angle (degree) | | | | | | | Final Concentration (%) | | |
|---|---|---|---|---|---|---|---|---|---|---|
| | 1 | 2 | 3 | 4 | 5 | 6 | 7 | PIB | Quat | PIBE |
| Ex. 149 | 96.98 | 91.15 | 88.40 | 86.90 | 85.84 | 84.79 | 83.86 | 0.1104 | 0.1115 | 0.0115 |

TABLE 14 shows contact angles obtained in durability tests with a microemulsion containing both PIB and PIBB as hydrophobes in EB solvent/cosurfactant.

TABLE 14

| Cycle # File Name | Contact Angle (degree) | | | | | | | Final Concentration (%) | | |
|---|---|---|---|---|---|---|---|---|---|---|
| | 1 | 2 | 3 | 4 | 5 | 6 | 7 | PIB | Quat | PIBE |
| Ex. 150 | 100.33 | 91.67 | 89.20 | 86.20 | 84.43 | 82.92 | 81.59 | 0.1106 | 0.1116 | 0.0115 |

TABLE 15 shows contact angles in durability tests with a microemulsion containing PIB as the hydrophobe and a mixture of two cationic emulsifiers (Quat/Quat2) in EB solvent/cosurfactant.

TABLE 15

| Cycle # File Name | Contact Angle (degree) | | | | | | | Final Concentration (%) | | |
|---|---|---|---|---|---|---|---|---|---|---|
| | 1 | 2 | 3 | 4 | 5 | 6 | 7 | PIB | Quat | Quat2 |
| Ex. 151 | 100.90 | 92.47 | 90.61 | 88.91 | 87.96 | 86.71 | 85.47 | 0.1180 | 0.1329 | 0.0090 |

TABLE 16 shows contact angles obtained in durability tests with a microemulsion containing PIB as the hydrophobe and a mixture of a cationic and a nonionic emulsifier in EB solvent/cosurfactant.

TABLE 16

| Cycle # File Name | Contact Angle (degree) | | | | | | | Final Concentration (%) | | |
|---|---|---|---|---|---|---|---|---|---|---|
| | 1 | 2 | 3 | 4 | 5 | 6 | 7 | PIB | Quat | Nonionic |
| Ex. 152 | 96.84 | 88.79 | 83.58 | 83.44 | 82.96 | 82.00 | 81.30 | 0.1198 | 0.1194 | 0.0110 |

Figure 9:
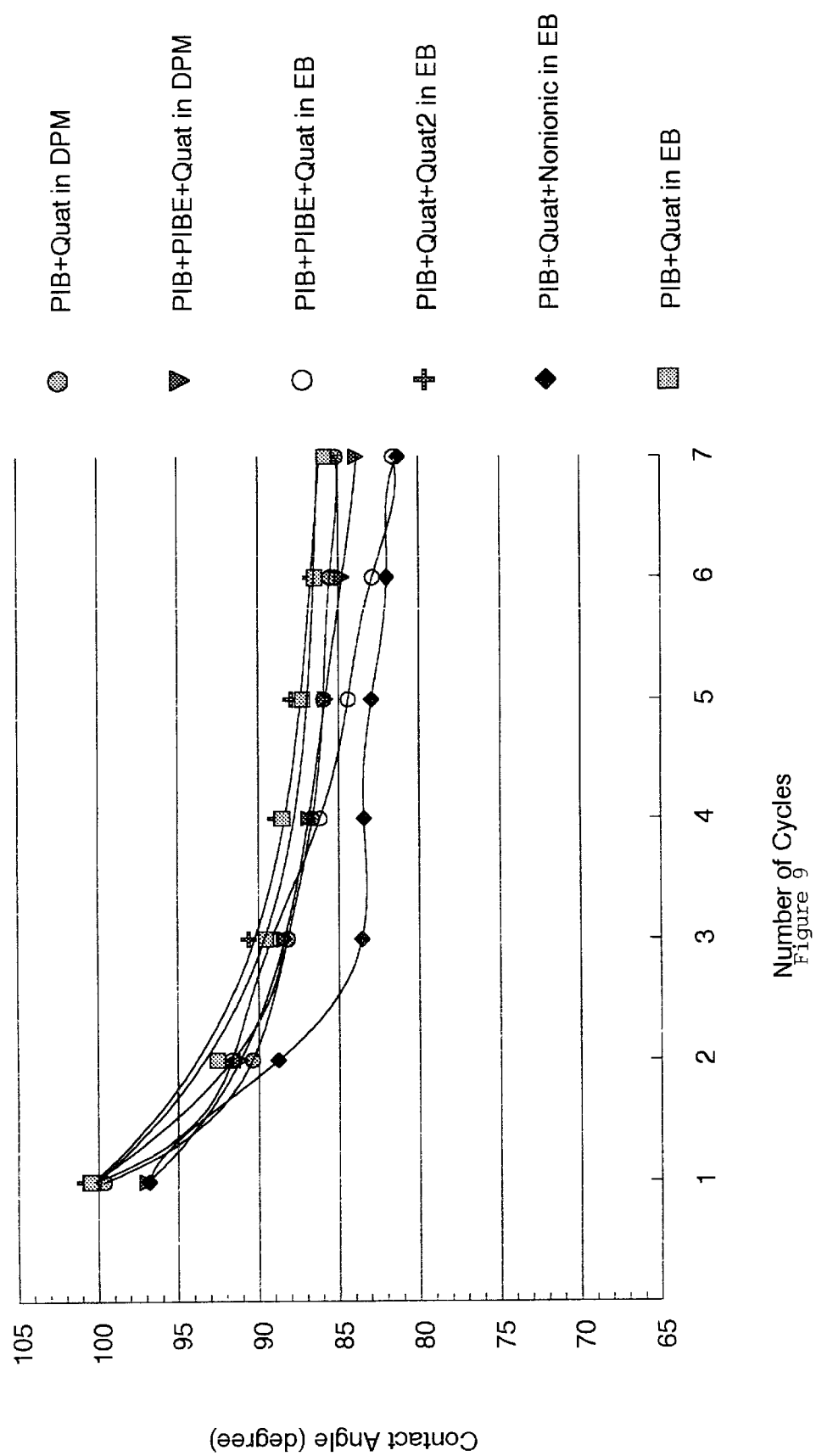
FIG. 9 shows durability of coatings of various spraywax/drying agent systems: Contact angles versus number of rinsing cycles. PIBB=polybutene of molecular weight of ~600, EB=ethylene glycol butyl ether, DPM=dipropylene glycol methyl ether, PIBB=epoxy functional polybutene, Quat+Quat2=mixture of cationic emulsifiers, nonionic=nonionic emulsifier.

Durability test results obtained with these various formulas are summarized in FIG. 9. For comparison the PIB +Quat in EB system is also shown (See Table 8).

All the data in FIG. 9 are in the same contact angle range except systems containing nonionic cosurfactants. Nonionic cosurfactants seem to reduce the initial hydrophobicity of the protective coating plated out onto the surface resulting in an undesirable reduction in contact angles.

The next set of examples represents systems containing a mixture of PIB/PIBA as hydrophobes.

TABLE 17 shows contact angles obtained in durability tests with microemulsions containing a mixture of PIB/PIBA= 77/23.

TABLE 17

| Cycle # File Name | Contact Angle (degree) | | | | | | | | | | |
|---|---|---|---|---|---|---|---|---|---|---|---|
| | 1 | 2 | 3 | 4 | 5 | 6 | 7 | 9 | 10 | 11 | 12 |
| Ex. 153–155 | 97.48 | 92.74 | 89.29 | 86.78 | 86.41 | 86.80 | 86.64 | 86.02 | 86.20 | 85.69 | 85.43 |

| Cycle # File Name | Contact Angle (degree) | | | | | | | | Final concentration (%) | | |
|---|---|---|---|---|---|---|---|---|---|---|---|
| | 13 | 14 | 16 | 17 | 18 | 19 | 20 | 21 | PIB | PIBA | Quat |
| Ex. 153–155 | 85.35 | 84.93 | 84.47 | 84.35 | 84.41 | 84.35 | 84.22 | 83.74 | 0.0286 | 0.0083 | 0.0336 |

TABLE 18 shows contact angles obtained in durability tests wit microemulsions containing a mixture of PIB/PIBA–55/44.

TABLE 18

| Cycle # File Name | Contact Angle (degree) | | | | | | | | | | |
|---|---|---|---|---|---|---|---|---|---|---|---|
| | 1 | 2 | 3 | 4 | 5 | 6 | 7 | 9 | 10 | 11 | 12 |
| Ex. 156–158 | 97.13 | 93.94 | 92.62 | 90.28 | 88.78 | 88.60 | 88.45 | 88.08 | 87.47 | 86.59 | 86.19 |

| Cycle # File Name | Contact Angle (degree) | | | | | | | | Final concentration (%) | | |
|---|---|---|---|---|---|---|---|---|---|---|---|
| | 13 | 14 | 16 | 17 | 18 | 19 | 20 | 21 | PIB | PIBA | Quat |
| Ex. 156–158 | 85.91 | 85.66 | 85.51 | 85.19 | 84.91 | 84.71 | 84.56 | 84.21 | 0.0206 | 0.0169 | 0.0296 |

TABLE 19 shows contact angles obtained in durability tests with microemulsions containing a mixture of PIB/PIBA= 30/79.

TABLE 19

| Cycle # File Name | Contact Angle (degree) | | | | | | | | | | |
|---|---|---|---|---|---|---|---|---|---|---|---|
| | 1 | 2 | 3 | 4 | 5 | 6 | 7 | 9 | 10 | 11 | 12 |
| Ex. 159–161 | 99.38 | 94.68 | 93.78 | 92.24 | 90.92 | 89.84 | 89.19 | 88.49 | 87.79 | 87.50 | 87.48 |

| Cycle # File Name | Contact Angle (degree) | | | | | | | | Final concentration (%) | | |
|---|---|---|---|---|---|---|---|---|---|---|---|
| | 13 | 14 | 16 | 17 | 18 | 19 | 20 | 21 | PIB | PIBA | Quat |
| Ex. 159–161 | 87.46 | 87.43 | 86.95 | 86.70 | 86.57 | 86.60 | 86.71 | 86.55 | 0.0110 | 0.0256 | 0.0217 |

TABLE 20 shows contact angles obtained in durability tests with microemulsions containing 100% PIBA.

TABLE 20

| Cycle # File Name | Contact Angle (degree) | | | | | | | | | | |
|---|---|---|---|---|---|---|---|---|---|---|---|
| | 1 | 2 | 3 | 4 | 5 | 6 | 7 | 9 | 10 | 11 | 12 |
| Ex. 162–164 | 101.70 | 97.23 | 95.54 | 94.63 | 93.82 | 92.82 | 92.06 | 90.85 | 90.80 | 90.64 | 90.35 |

| Cycle # File Name | Contact Angle (degree) | | | | | | | | Final concentration (%) | | |
|---|---|---|---|---|---|---|---|---|---|---|---|
| | 13 | 14 | 16 | 17 | 18 | 19 | 20 | 21 | PIB | PIBA | Quat |
| Ex. 162–164 | 90.04 | 90.00 | 89.52 | 89.41 | 89.19 | 89.10 | 89.04 | 88.89 | 0 | 0.0368 | 0.00945 |

The next set of examples represents systems containing a mixture of PIB/PIBA/MSO as hydrophobes.

TABLE 21 summarizes contact angles of microemulsions containing PIB/PIBA/MSO=33/27/40 wt. %. A total of 3 repeat experiments have been carried out and the averages are recorded.

TABLE 21

| Cycle # File Name | Contact Angle (degree) | | | Final Concentration (%) | | | |
|---|---|---|---|---|---|---|---|
| | 1 | 2 | 3 | PIB | MSO | Quat | PIBA |
| Ex. 165 | 99.12 | 94.21 | 92.30 | 0.0641 | 0.0800 | 0.1464 | 0.0527 |
| Ex. 166 | 99.27 | 92.51 | 92.07 | 0.0321 | 0.0400 | 0.0732 | 0.0263 |
| Ex. 167 | 99.38 | 93.71 | 92.29 | 0.0064 | 0.0080 | 0.0146 | 0.0053 |
| Average | 99.26 | 93.48 | 92.22 | | | | |

TABLE 22 summarizes contact angles of microemulsions containing PIB/PIBA/MSO=50/20/30 wt. %. A total of 5 repeat experiments have been carried out and the averages are recorded.

TABLE 22

| Cycle # File Name | Contact Angle (degree) | | | Final Concentration (%) | | | |
|---|---|---|---|---|---|---|---|
| | 1 | 2 | 3 | PIB | MSO | Quat | PIBA |
| Ex. 168 | 102.00 | 96.13 | 94.39 | 0.1230 | 0.0776 | 0.1701 | 0.0488 |
| Ex. 169 | 101.66 | 97.89 | 94.78 | 0.0625 | 0.0388 | 0.0851 | 0.0244 |
| Ex. 170 | 100.86 | 98.25 | 95.48 | 0.0369 | 0.0233 | 0.0510 | 0.0146 |
| Ex. 171 | 101.75 | 97.01 | 92.34 | 0.0123 | 0.0078 | 0.0170 | 0.0049 |
| Ex. 172 | 102.64 | 97.97 | 97.18 | 0.6250 | 0.3880 | 0.8510 | 0.2440 |
| Average | 101.78 | 97.45 | 94.83 | | | | |

Figure 10:
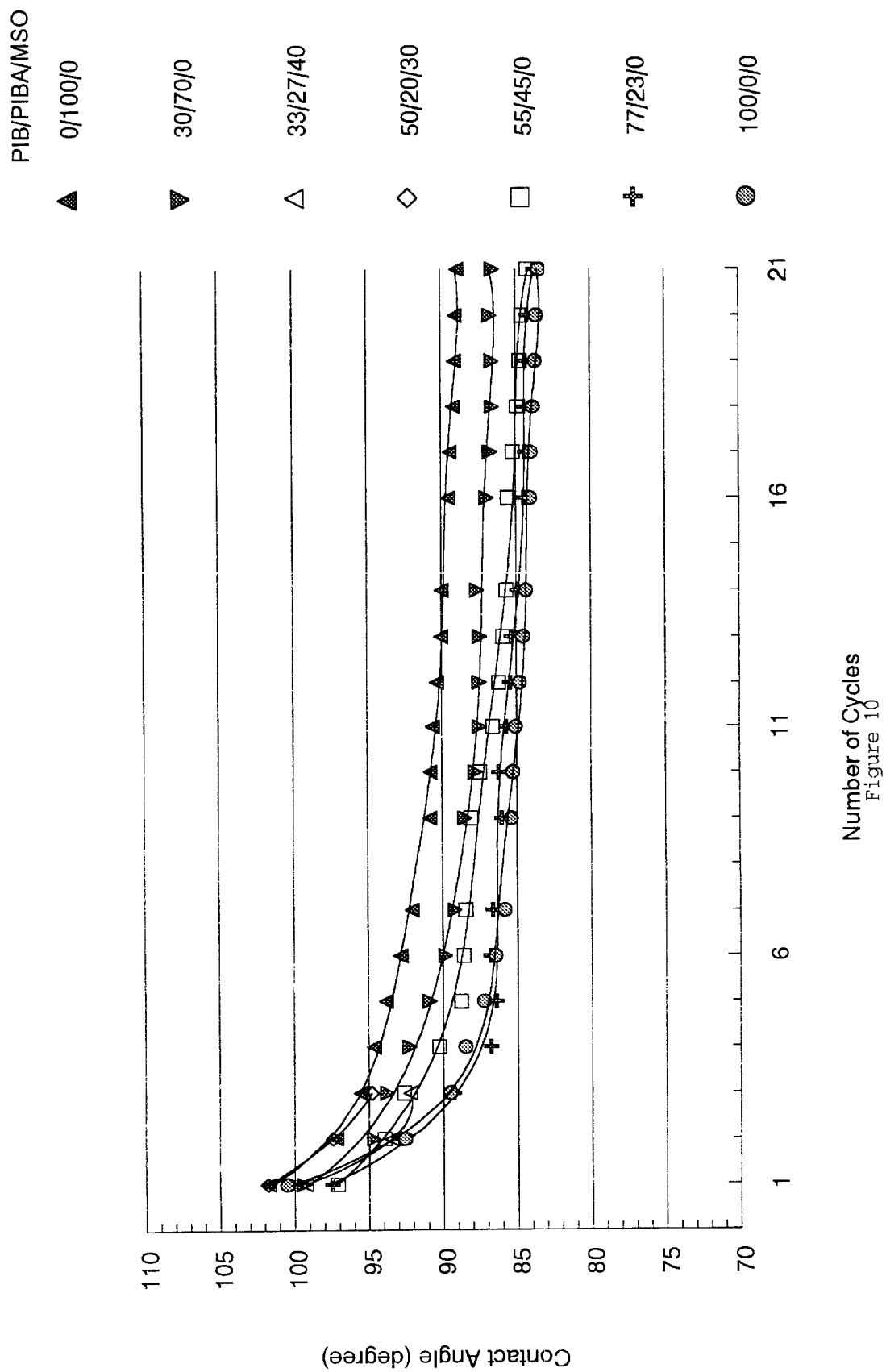
FIG. 10 shows durability of coatings of various spraywax/drying agent systems at various PIB/PIBA/MSO compositions in the hydrophobe: Contact angles versus number of rinsing cycles. PIBA=amino-functional polybutene.

FIG. 10 Summarizes the results of TABLES 8 and 17–22. The contact angles increase with the amino-functional PIBA content. These systems are more durable, due to the increasing content of the higher molecular weight PIBA in the hydrophobe, and to the presence of the reactive amino group.

It is well known that certain fluoropolymers and silicones can increase the water repellency of various substrates. The next series of experiments demonstrate that these additives can be incorporated into systems disclosed in the present invention to further enhance the hydrophobicity and durability of the surfaces. However, the use of these expensive additives will be limited because of their high cost.

The next examples represent systems containing a mixture of PIB/PIBA/Fluoro as hydrophobes.

TABLE 23 summarizes contact angles of a microemulsion containing PIB/PIBA/Flouro=0/67/33 wt. %.

TABLE 23

| Cycle # File Name | Contact Angle (degree) | | | | | | | Final Concentration (%) | | | |
| --- | --- | --- | --- | --- | --- | --- | --- | --- | --- | --- | --- |
| | 1 | 2 | 3 | 4 | 5 | 6 | 7 | PIB | Quat | PIBA | Fluoro |
| Ex. 173 | 103.40 | 100.10 | 99.39 | 98.48 | 97.65 | 96.82 | 96.13 | 0 | 0.0786 | 0.0306 | 0.01503 |

TABLE 24 summarizes contact angles of a microemulsion containing PIB/PIBO/Fluoro=67/0/33 wt. %.

TABLE 24

| Cycle # File Name | Contact Angle (degree) | | | | | | | | | | | |
| --- | --- | --- | --- | --- | --- | --- | --- | --- | --- | --- | --- | --- |
| | 1 | 2 | 3 | 4 | 5 | 6 | 7 | 9 | 10 | 11 | 12 | 13 |
| Ex. 174–176 | 99.59 | 93.08 | 91.59 | 89.60 | 87.62 | 87.42 | 87.52 | 87.13 | 87.20 | 87.05 | 86.89 | 86.58 |

| Cycle # File Name | Contact Angle (degree) | | | | | | | Final concentration (%) | | | |
| --- | --- | --- | --- | --- | --- | --- | --- | --- | --- | --- | --- |
| | 14 | 16 | 17 | 18 | 19 | 20 | 21 | PIB | Quat | PIBA | Fluoro |
| Ex. 174–176 | 86.70 | 86.31 | 86.48 | 86.39 | 86.20 | 86.24 | 86.05 | 0.1040 | 0.0753 | 0 | 0.04995 |

TABLE 25 summarizes contact angles of a microemulsion containing 100% flouropolymer as hydrophobe (PIB/PIBA/Flouro=0/0/100).

TABLE 25

| Cycle # File Name | Contact Angles (degree) | | | | | | | | | | | |
| --- | --- | --- | --- | --- | --- | --- | --- | --- | --- | --- | --- | --- |
| | 1 | 2 | 3 | 4 | 5 | 6 | 7 | 9 | 10 | 11 | 12 | 13 |
| Ex. 177–179 | 108.04 | 99.64 | 98.35 | 97.34 | 96.71 | 95.92 | 95.35 | 94.40 | 93.79 | 93.37 | 92.97 | 92.50 |

| Cycle # File Name | Contact Angle (degree) | | | | | | | Final concentration (%) | | | |
| --- | --- | --- | --- | --- | --- | --- | --- | --- | --- | --- | --- |
| | 14 | 16 | 17 | 18 | 19 | 20 | 21 | PIB | Quat | PIBA | Fluoro |
| Ex. 177–179 | 92.33 | 91.94 | 91.97 | 91.61 | 91.35 | 91.34 | 91.19 | 0 | 0 | 0 | 0.090 |

TABLE 26 summarizes contact angles of a microemulsion containing 100% PIB as hydrophobe (PIB/PIBA/Flouro=100/0/0).

TABLE 26

| Cycle # File Name | Contact Angles (degree) | | | | | | | | | | | |
|---|---|---|---|---|---|---|---|---|---|---|---|---|
| | 1 | 2 | 3 | 4 | 5 | 6 | 7 | 9 | 10 | 11 | 12 | 13 |
| Ex. 180–182 | 102.00 | 93.06 | 89.41 | 87.82 | 87.01 | 86.79 | 86.30 | 85.98 | 85.83 | 85.60 | 85.95 | 85.71 |

| Cycle # File Name | Contact Angle (degree) | | | | | | | Final concentration (%) | | | |
|---|---|---|---|---|---|---|---|---|---|---|---|
| | 14 | 16 | 17 | 18 | 19 | 20 | 21 | PIB | Quat | PIBA | Fluoro |
| Ex. 180–182 | 85.66 | 84.80 | 84.85 | 84.74 | 84.78 | 84.76 | 84.60 | 0.1252 | 0.0906 | 0 | 0 |

Figure 11:
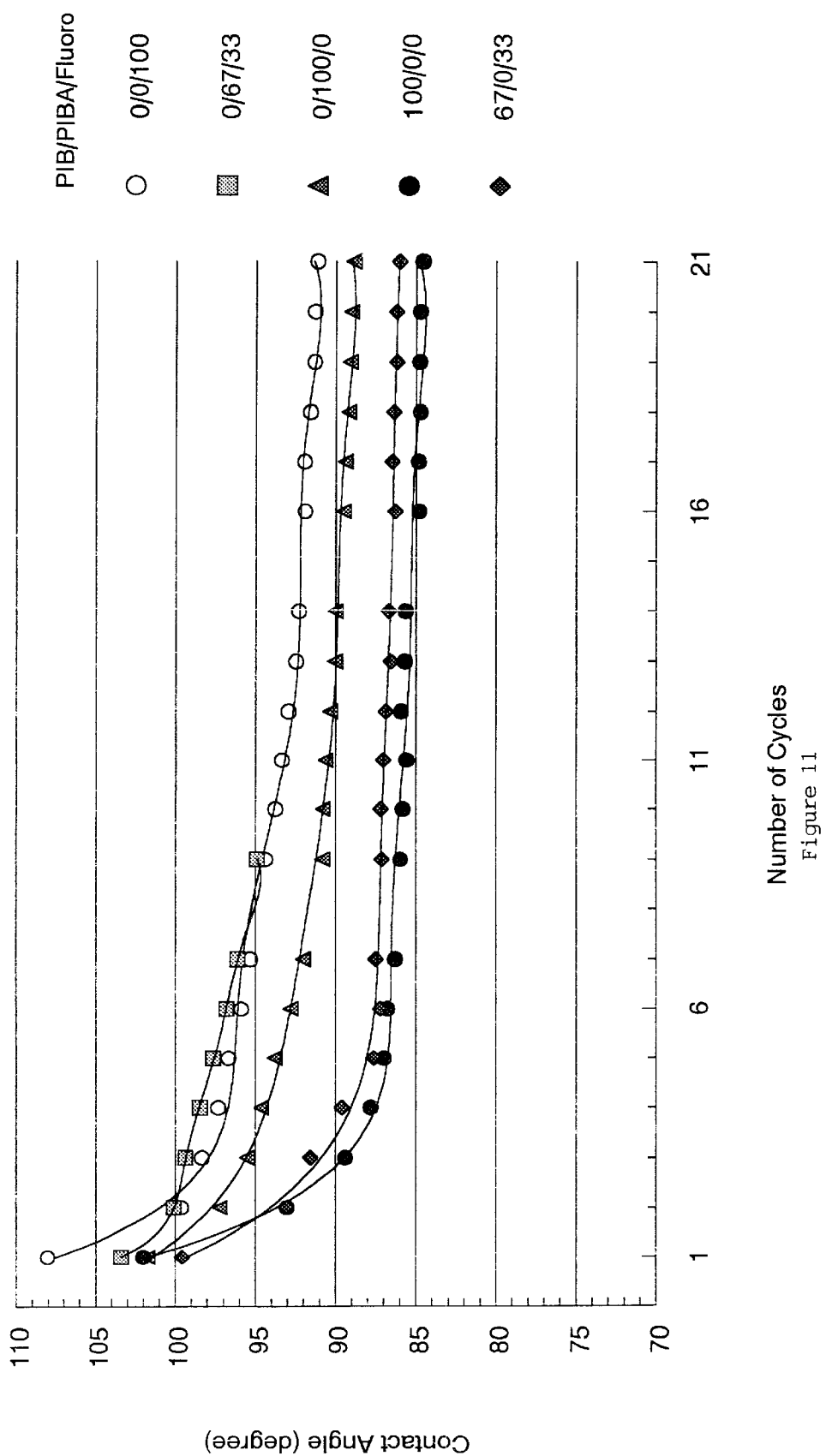
FIG. 11 shows durability of coatings of various spraywax/drying agent systems at various PIB/PIBA/Fluoro compositions in the hydrophobe: Contact angles versus number of rinsing cycles. Fluoro=fluoropolymer.

FIG. 11 summarizes the results of TABLES 22, and 23–26. Systems with flouropolymers show the highest improvement in initial contact angles an durability cycles, which indicates that the flouropolymer is the most hydrophobic system among those investigated. Replacing one third of the PIBA by flouropolymer, both the initial contact angle and the subsequent contact angles measured after many rinsing cycles show only a slight improvement. The next examples represent systems with a mixture of PIB/silicone as hydrophobes.

TABLE 27 summarizes contact angles of a microemulsion containing 100% silicone polymer (PIB/Silicone=0/100).

TABLE 27

| Cycle # File Name | Contact Angle (degree) | | | | | | | Final Concentration (%) | |
|---|---|---|---|---|---|---|---|---|---|
| | 1 | 2 | 3 | 4 | 5 | 6 | 7 | PIB | Silicone |
| Ex. 183 | 94.51 | 93.76 | 93.83 | 94.03 | 94.09 | 93.81 | 93.61 | 0 | 0.090 |

TABLE 28 summarizes contact angles of a microemulsion containing PIB/Silicone=80/20 wt. % as hydrophobe.

TABLE 28

| Cycle # File Name | Contact Angle (degree) | | | | | | | | | | |
|---|---|---|---|---|---|---|---|---|---|---|---|
| | 1 | 2 | 3 | 4 | 5 | 6 | 7 | 9 | 10 | 11 | 12 |
| Ex. 184–186 | 101.06 | 93.75 | 90.29 | 88.22 | 86.61 | 85.77 | 85.54 | 85.47 | 85.34 | 85.49 | 85.47 |

| Cycle # File Name | Contact Angle (degree) | | | | | | | Final concentration (%) | | |
|---|---|---|---|---|---|---|---|---|---|---|
| | 13 | 14 | 16 | 17 | 18 | 19 | 20 | 21 | PIB | Quat | Silicone |
| Ex. 184–186 | 85.24 | 84.95 | 85.25 | 85.20 | 85.22 | 85.12 | 85.02 | 85.03 | 0.1103 | 0.0824 | 0.0274 |

Figure 12:
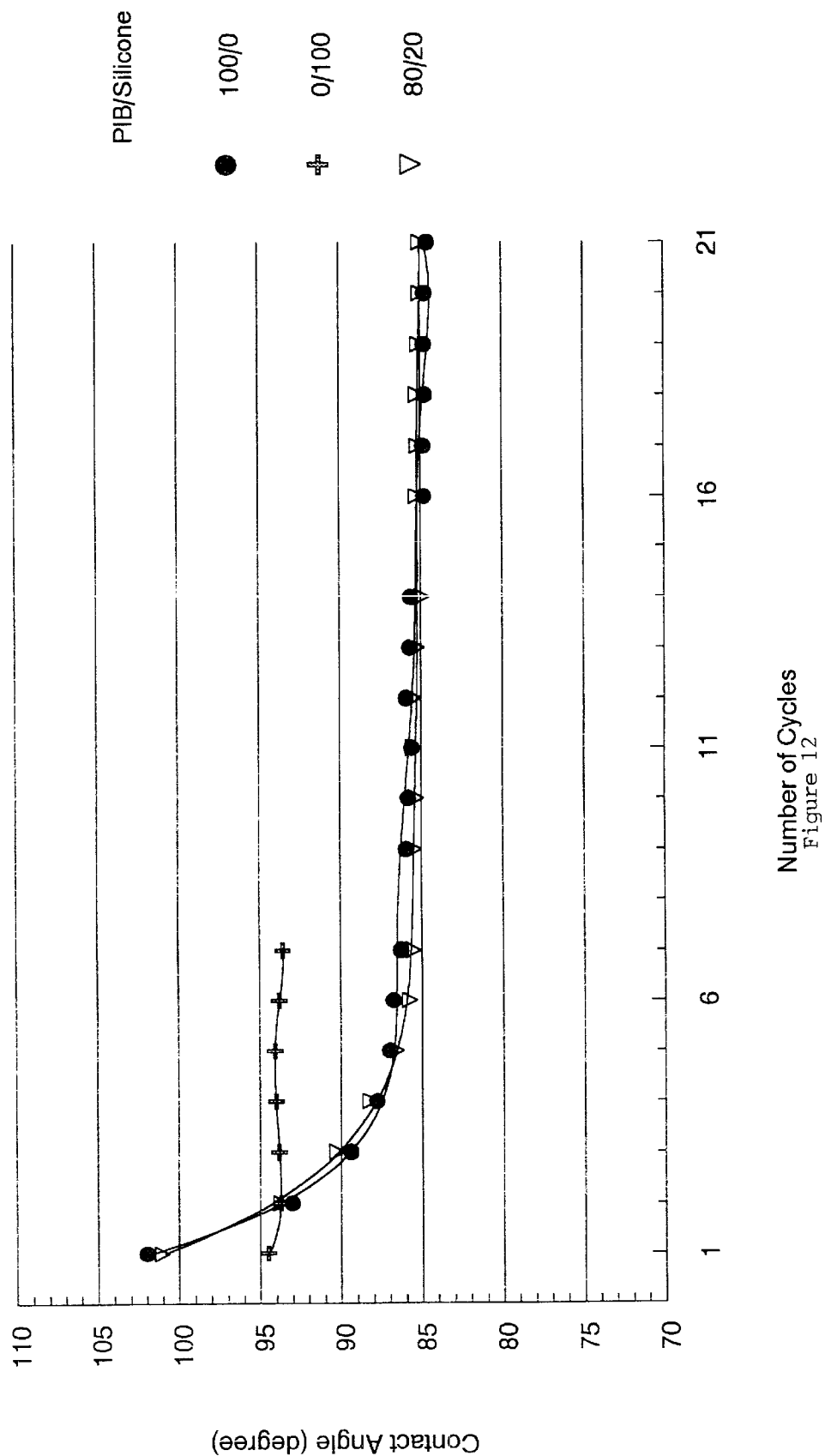
FIG. 12 shows durability of coatings of various spraywax/drying agent systems at various PIB/Silicone compositions in the hydrophobe: Contact angles versus number of rinsing cycles. Silicone=silicone polymer.

FIG. 12 summarizes the results of TABLES 26–28. By replacing one fifth of the PIB with a silicone polymer, there is no measurable improvement in neither the initial contact angles nor in the subsequent contact angles measured in durability tests. The undesirable effect of the silicone on freshly painted surfaces in paint shops (orange peel effect) could make the inexpensive PIB containing hydrophobes a good replacement of silicones in spraywaxes.

These exemplary formulations are intended as illustrative of the present invention. The big variety of additives within the scope of this invention, which might increase, decrease or not change the improved hydrophobicity of this invention, will readily present themselves to one skilled in the art.

Based on an analysis of the prior art, the earlier inventions are largely based on subjective, mostly visual observations. The present invention relates to objective scientific methods that demonstrate quantitatively the surprising superiority of the invention herein over those described in the prior art.

While in accordance with the Patent statutes, a preferred mode and best embodiment have been disclosed.

What is claimed is:

1. A hydrophobizing microemulsion, comprising:
a hydrophobe component, an emulsifying component comprising at least a cationic quaternary ammonium salt, wherein said quaternary ammonium salt is present in an amount from about 10 to about 500 parts by weight per 100 parts by weight of said hydrophobe component, optionally water, or optionally a solvent, or both, said hydrophobe component comprising a polyalkene derived from repeat groups having from 3 to about 10 carbon atoms, said polyalkene comprising a polyisbbutylene component having a number average molecular weight from about 100 to about 3,000.

2. A hydrophobizing microemuision according to claim 1, wherein said polyisobutylene component comprises polyisobutylene, polybutene, a polyisobutylene copolymer, a polyisobutylene derivative, or combinations thereof, including said water, and wherein said emulsifying component optionally comprises a nonionic emulsifier, an amphoteric emulsifier, or combinations thereof.

3. A hydrophobizing microemulsion according to claim 2, wherein the amount of said polyisobutylene, said polybutene, said polyisobutylene copolymer, or said polyisobutylene derivative, or combinations thereof, is from about 1.0 to about 100 parts by weight per 100 parts by weight of said hydrophobe component.

4. A hydrophobizing microemulsion according to claim 3, wherein the amount of said quaternary ammonium salt is from about 10 to about 200 parts by weight per 100 parts by weight of said hydrophobe omponent.

5. A hydrophobizing microemulsion according to claim 3, wherein said hydrophobe component contains said polyisobutylene, or said polyisobutylene derivative, or combinations thereof, in an amount from about 25 to about 100 parts by weight per 100 parts by weight of said hydrophobe component, wherein the number average molecular weight of said polyisobutylene, or said polyisobutylene derivative, is from about 150 to about 1,000, and wherein said microemulsion has a colloidal diameter of less than 400 nm.

6. A hydrophobizing microemulsion according to claim 5, wherein said quaternary ammonium salt is dicoco dimethyl ammonium chloride, ditallow dimethyl ammonium chloride, isodecyloxypropyl bis-[2-hydroxyethyl] methyl ammonium chloride, or isotridecyloxypropyl dihydroxyethyl methyl ammonium chloride, or combinations thereof.

7. A hydrophobizing microemulsion according to claim 1, including said solvent, and wherein said emulsifying component optionally comprises a nonionic emulsifier, an amphoteric emulsifier, or combinations thereof.

8. A hydrophobizing microemulsion according to claim 7, wherein said polyisobutylene component comprises an amount of polyisobutylene, polybutene, a polyisobutylene copolymer, or a polyisobutylene derivative, or combinations thereof, of from about 1.0 to about 100 parts by weight per 100 parts by weight of said hydrophobe content.

9. A hydrophobizing microemulsion according to claim 8, wherein said solvent is a glycol ether having a total of from 2 to about 20 carbon atoms, or an alcohol having a total of from 1 to about 20 carbon atoms, or combinations thereof, and wherein the amount of said solvent is from about 0.1 to about 200 parts by weight per 100 parts by weight of said hydrophobe component.

10. A hydrophobizing microemulsion according to claim 9, wherein said hydrophobe component contains said polyisobutylene, or said polyisobutylene derivative, or combinations thereof, in an amount from about 25 to about 100 parts by weight per 100 parts by weight of said hydrophobe component, and wherein the amount of said solvent is from about 1 to about 50 parts by weight per 100 parts by weight of said hydrophobe component.

11. A hydrophobizing microemulsion according to claim 10, wherein said solvent is dipropylene glycol methyl ether, propylene glycol, n-butyl ether, or ethylene glycol n-butyl ether, or combinations thereof.

12. A hydrophobizing microemulsion according to claim 11, including said water, wherein said polyisobutylene component has a number average molecular weight of about 150 to about 1,000, and wherein saidhydrophobe component also comprises mineral seal oil.

13. A hydrophobizing microemulsion according to claim 8, including said water.

14. A hydrophobizing microemulsion according to claim 10, including said water.

15. A hydrophobizing microemulsion according to claim 12, wherein said microemulsion has a colloidal diameter range of about 20 to about 80 nanometers.

16. A hydrophobizing microemulsion for vehicle surfaces, comprising;
a hydrophobe component, an emulsifying component comprising at least a cationic quaternary ammonium salt in an amount from about 10 to about 500 parts by weight per 100 parts by weight of said hydrophobe component, water, and a solvent, said hydrophobe component comprising a polyisobutylene component having a number average molecular weight from about 100 to about 3000, said polyisobutylene component comprising polyisobutylene, polybutene, a polyisobutylene copolymer, a polyisobutylene derivative, or combinations thereof, the hydrophobe emulsion having an initial advancing contact angle of at least about 95 degrees.

17. A hydrophobizing microemulsion according to claim 16, wherein said emulsifying component optionally comprises a nonionic emulsifier, an amphoteric emulsifier, or combinations thereof.

18. A hydrophobizing microemulsion according to claim 17, wherein said advancing contact angle is at least about 96 degrees.

19. A hydrophobizing microemulsion according to claim 18, wherein said solvent is a glycol ether having a total of from 2 to about 20 carbon atoms, or an alcohol having from about 1 to about 20 carbon atoms, or combinations thereof.

20. A hydrophobizing microemulsion according to claim 19, wherein said contact angle is from about 98 degrees to about 103 degrees.

21. A hydrophobizing microemulsion according to claim 20, wherein said solvent is dipropylene glycol methyl ether, propylene glycol n-butyl ether, or ethylene glycol n-butyl ether, or combinations thereof.

22. A hydrophobizing microemulsion according to claim 21, wherein said polyisobutylene derivative is an amino-functional polyisobutylene, a telechelic amino-functional polyisobutylene, or combinations thereof.

23. A hydrophobizing microemulsion according to claim 20, wherein said hydrophobe optionally is a mixture of an emulsifiable fluoropolymer or an emulsifiable silicone polymer and said polyisobutylene, said polybutene, said polyisobutylene copolymer, or said polyisobutylene derivative, and wherein said polyisobutylene derivative has a saturated or unsaturated end-group wherein said end-group comprises methylpropenyl, halide, chlorosilyl, hydroxyl, amino, amido, cyano, allyl, epoxy, carboxyl, ester, and succinic anhydride, or combinations thereof, or a polymer block derived from an aliphatic or aromatic initiator residue.

24. A vehicle wash aid, comprising the hydrophobizing microemulsion of claim 2.

25. A vehicle wash aid, comprising the hydrophobizing microemulsion of claim 5.

26. A vehicle wash aid, comprising the hydrophobizing microemulsion of claim 7.

27. A vehicle wash, aid, comprising the hydrophobizing microemulsion of claim 10.

28. A vehicle wash aid, comprising the hydrophobizing microemulsion of claim 12.

29. A vehicle wash aid, comprising the hydrophobizing microemulsion of claim 16.

* * * * *

UNITED STATES PATENT AND TRADEMARK OFFICE
CERTIFICATE OF CORRECTION

PATENT NO. : 6,462,009 B1
DATED : October 8, 2002
INVENTOR(S) : Andras Nagy, Joseph P. Kennedy and Lonn L. Swinehart It is certified that error appears in the above-identified patent and that said Letters Patent is hereby corrected as shown below:

<u>Title page,</u>
Item [57], ABSTRACT,
Line 4, please replace "Polyisobutylene copolymers" with -- Polyisobutylene, copolymers --.

<u>Column 4,</u>
Line 32, please replace "PIBB" with -- PIBE --.

<u>Column 6,</u>
Line 7, please replace "Analyzer,.available" with -- Analyzer, available --.

<u>Column 10,</u>
Line 43, please replace "intodistilled" with -- into distilled --.

<u>Columns 13 and 14,</u>
Table 7, please replace cycle # "01" with -- 10 --.
Table 7, please replace for Example 52, cycle #2, "84.67" with -- 88.67 --.

<u>Column 19,</u>
Line 46, please replace "Mn" with -- $M_n$ --.
Line 54, please replace "PIBB" with -- PIBE --.

<u>Column 20,</u>
Line 19, please replace "Kumnier" with -- Kummer --.

<u>Column 21,</u>
Second line after Table 12, please replace "PIBB" with -- PIBE --.
Second line after Table 13, please replace "PIBB" with -- PIBE --.

<u>Column 24,</u>
Line 41, after Table 17, please replace "wit" with -- with --.
Line 42, after Table 17, please replace "44" with -- 45 --.
Line 67, after Table 18, please replace "79" with -- 70 --.

UNITED STATES PATENT AND TRADEMARK OFFICE
CERTIFICATE OF CORRECTION

PATENT NO.    : 6,462,009 B1
DATED         : October 8, 2002
INVENTOR(S)   : Andras Nagy, Joseph P. Kennedy and Lonn L. Swinehart It is certified that error appears in the above-identified patent and that said Letters Patent is hereby corrected as shown below:

Column 28,
Second line after Table 23, please replace "PIBO" with -- PIBA --.

Column 31,
Line 19, please replace "omponent" with -- component --.
Line 64, please replace "saidhydrophobe" with -- said hydrophobe --.

Signed and Sealed this

Twenty-fifth Day of February, 2003

JAMES E. ROGAN
*Director of the United States Patent and Trademark Office*